United States Patent
Viering et al.

(10) Patent No.: US 12,200,522 B2
(45) Date of Patent: Jan. 14, 2025

(54) COMMUNICATION CONTROL MECHANISM FOR MULTI-PANEL UE

(71) Applicant: NOKIA TECHNOLOGIES OY, Espoo (FI)

(72) Inventors: Ingo Viering, Munich (DE); Christian Rom, Aalborg (DK); Simon Svendsen, Aalborg (DK); Samantha Caporal Del Barrio, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 401 days.

(21) Appl. No.: 17/799,571

(22) PCT Filed: Feb. 13, 2020

(86) PCT No.: PCT/EP2020/053738
§ 371 (c)(1),
(2) Date: Aug. 12, 2022

(87) PCT Pub. No.: WO2021/160263
PCT Pub. Date: Aug. 19, 2021

(65) Prior Publication Data
US 2023/0078952 A1 Mar. 16, 2023

(51) Int. Cl.
*H04W 24/08* (2009.01)
*H04W 24/10* (2009.01)
*H04W 36/00* (2009.01)

(52) U.S. Cl.
CPC .......... *H04W 24/08* (2013.01); *H04W 24/10* (2013.01)

(58) Field of Classification Search
CPC ................. H04W 24/08; H04W 24/10; H04W 36/0005
See application file for complete search history.

(56) References Cited

U.S. PATENT DOCUMENTS 11,102,688 B2 * 8/2021 Park ................ H04W 36/0079
11,523,375 B2 * 12/2022 Karjalainen ......... H04B 7/0417
(Continued)

FOREIGN PATENT DOCUMENTS

WO 2018/228702 A1 12/2018

OTHER PUBLICATIONS

International Search Report and Written Opinion dated Oct. 16, 2020 corresponding to International Patent Application No. PCT/EP2020/053738.

(Continued)

*Primary Examiner* — Ahmed Elallam
(74) *Attorney, Agent, or Firm* — Robert P. Michal, Esq.; Carter, DeLuca & Farrell LLP

(57) ABSTRACT

An apparatus for use by a UE configured to conduct a communication in a communication network. The apparatus is configured to receive and process signals from the communication network via signal receiving portions, wherein one of the signal receiving portions is a serving cell signal receiving portion used for connecting to the communication network via a serving cell, and another of the signal receiving portions is a non-serving cell signal receiving portion being not used for connecting to the communication network. A signal receiving portion specific offset value is obtained for each of the signal receiving portions. Signal quality values for signals received by the signal receiving portions from the communication network are measured, wherein the cells include the serving cell. A measurement report is sent to the communication network on the basis of the results of the signal quality measurements and the offset values for the signal receiving portions.

20 Claims, 7 Drawing Sheets

(56) References Cited

U.S. PATENT DOCUMENTS

| | | | |
|---|---|---|---|
| 12,003,038 B2* | 6/2024 | Korva | H01Q 21/065 |
| 12,015,209 B2* | 6/2024 | Barabash | H01Q 3/36 |
| 2010/0197300 A1 | 8/2010 | Van der Velde et al. | |
| 2023/0261725 A1* | 8/2023 | Svendsen | H01Q 3/36 |
| | | | 455/456.6 |

OTHER PUBLICATIONS

Ericsson, "[108#28][R16RRC] 38331 Rel-16 CR Merge," 3GPP Draft; 38331 Rel-16 CR Merger V1, 3GPP TSG-RAN WG2 Meeting #109, Athens, Greece, Feb. 24-28, 2020, Feb. 3, 2020, XP051845875.

3GPP TS 38.331 V15.8.0 (Dec. 2019), Technical Specification, 3rd Generation Partnership Project; Technical Specification Group Radio Access Network; NR; Radio Resource Control (RRC) protocol specification (Release 15), Dec. 2019.

* cited by examiner

COMMUNICATION CONTROL MECHANISM FOR MULTI-PANEL UE

BACKGROUND

Field

Examples of embodiments relate to apparatuses, methods, systems, computer programs, computer program products and (non-transitory) computer-readable media usable for conducting a communication control for a communication element or function, such as a user equipment, which is equipped with a plurality of signal transmitting/receiving portions, such as antenna arrays (also referred to as panels), wherein one or more of the signal transmitting/receiving portions is currently communicating with a serving cell while at least one or more of the signal transmitting/receiving portions is not used for communicating, and in particular to apparatuses, methods, systems, computer programs, computer program products and (non-transitory) computer-readable media usable for a communication control mechanism allowing an improved measurement reporting to the communication network usable e.g. for a conditional handover procedure.

Background Art

The following description of background art may include insights, discoveries, understandings or disclosures, or associations, together with disclosures not known to the relevant prior art, to at least some examples of embodiments of the present disclosure but provided by the disclosure. Some of such contributions of the disclosure may be specifically pointed out below, whereas other of such contributions of the disclosure will be apparent from the related context.

The following meanings for the abbreviations used in this specification apply:
3GPP 3$^{rd}$ Generation Partnership Project
4G fourth generation
5G fifth generation
BS base station
CHO conditional handover
CN core network
CoMP cooperative multipoint
CPU central processing unit
DL downlink
eNB evolved node B
ETSI European Telecommunications Standards Institute
gNB next generation node B
HO handover
ID identifier
LTE Long Term Evolution
LTE-A LTE Advanced
NF network function
NR new radio
NW network
PCI physical cell identifier
RAN radio access network
RAT radio access technology
RLF radio link failure
RRC radio link control
SINR signal to interference plus noise ratio
UE user equipment
UL uplink
UMTS universal mobile telecommunication system

SUMMARY

According to an example of an embodiment, there is provided, for example, an apparatus for use by a communication element or function configured to conduct a communication in a communication network, the apparatus comprising at least one processing circuitry, and at least one memory for storing instructions to be executed by the processing circuitry, wherein the at least one memory and the instructions are configured to, with the at least one processing circuitry, cause the apparatus at least: to receive and process signals from the communication network via at least two signal receiving portions, wherein at least one of the at least two signal receiving portions is a serving cell signal receiving portion used for connecting to the communication network via at least one serving cell of the communication network, and at least one other of the at least two signal receiving portions is a non-serving cell signal receiving portion being not used for connecting to the communication network, to obtain a signal receiving portion specific offset value for each of the at least two signal receiving portions, to measure signal quality values for signals received by the at least two signal receiving portions from a plurality of cells of the communication network, wherein the plurality of cells include the at least one serving cell, and to decide on sending a measurement report to the communication network on the basis of the results of the measurements of the signal quality values and the signal receiving portion specific offset values for the at least two signal receiving portions.

Furthermore, according to an example of an embodiment, there is provided, for example, a method for use in a communication element or function configured to conduct a communication in a communication network, the method comprising receiving and processing signals from the communication network via at least two signal receiving portions, wherein at least one of the at least two signal receiving portions is a serving cell signal receiving portion used for connecting to the communication network via at least one serving cell of the communication network, and at least one other of the at least two signal receiving portions is a non-serving cell signal receiving portion being not used for connecting to the communication network, obtaining a signal receiving portion specific offset value for each of the at least two signal receiving portions, measuring signal quality values for signals received by the at least two signal receiving portions from a plurality of cells of the communication network, wherein the plurality of cells include the at least one serving cell, and deciding on sending a measurement report to the communication network on the basis of the results of the measurements of the signal quality values and the signal receiving portion specific offset values for the at least two signal receiving portions.

According to further refinements, these examples may include one or more of the following features:
the at least two signal receiving portions may comprise antenna arrays having receiving properties allowing that signals from the at least one serving cell are received only by a part of the signal receiving portions;
the signal receiving portion specific offset value for each of the at least two signal receiving portions may be obtained by at least one of receiving, from the communication network, and processing a dedicated signal receiving portion specific offset value for each of the at least two signal receiving portions, receiving, from the communication network, and processing a first signal receiving portion specific offset value to be used for a non-serving cell signal receiving portion, and receiving, from the communication network, and processing a first signal receiving portion specific offset value to be used for a non-serving cell signal receiving portion and a second signal receiving portion specific offset value being different to the first signal receiving portion specific offset value and to be used for a serving cell signal receiving portion;

the signal receiving portion specific offset value for each of the at least two signal receiving portions may be obtained by determining at least a first signal receiving portion specific offset value to be used for a non-serving cell signal receiving portion on the basis of configuration data and current communication conditions;

the current communication conditions may include one of a number of candidates for a conditional handover procedure determined on the basis of signals received by the at least one serving cell signal receiving portion, and a maximum permissible exposure restriction for signaling via the at least two signal receiving portions;

the configuration data may be data being stored in an internal memory or being received from the communication network;

when deciding on sending a measurement report to the communication network, a sorting processing for sorting the measurement results and a selecting processing for selecting measurement results to be included in the measurement report may be conducted, wherein the signal receiving portion specific offset value may cause that a parameter used for at least one of the sorting processing and the selecting processing and based on the measurement result of signal quality values received by a non-serving cell signal receiving portion is enhanced compared to a parameter used for at least one of the sorting processing and the selecting processing and based on the measurement result of signal quality values received by a serving cell signal receiving portion;

it may be decided on sending a measurement report to the communication network by using a conditional handover event considering signal quality measurements of the serving cell and at least one non-serving cell;

the sending of a measurement report to the communication network may be triggered on the basis of the results of the measurements of the signal quality values or on the basis of a sum of the results of the measurements of the signal quality values and the respective signal receiving portion specific offset value;

in the measurement report, it may be indicated to which of the at least two signal receiving portions a measurement result is related, or it may be indicated whether a measurement result is related to a serving cell signal receiving portion or a non-serving cell signal receiving portion;

an indication of the signal receiving portion specific offset values used for deciding on sending the measurement report may be sent to the communication network.

Furthermore, according to an example of an embodiment, there is provided, for example, an apparatus for use by a communication network control element or function configured to control a communication of a communication element or function in a communication network, the apparatus comprising at least one processing circuitry, and at least one memory for storing instructions to be executed by the processing circuitry, wherein the at least one memory and the instructions are configured to, with the at least one processing circuitry, cause the apparatus at least: to receive and process a measurement report from the communication element or function being based on results of measurements of signal quality values signals of signals received by at least two signal receiving portions of the communication element or function, wherein at least one of the at least two signal receiving portions is a serving cell signal receiving portion used for connecting the communication element or function to the communication network via at least one serving cell of the communication network, and at least one other of the at least two signal receiving portions is a non-serving cell signal receiving portion being not used for connecting the communication element or function to the communication network, to identify, from the measurement report, cells whose signals are received by a non-serving cell signal receiving portion of the communication element or function, and to prepare a set of selected cells of the communication network for a conditional handover procedure of the communication element or function, wherein the selected cells comprise at least one cell whose signals are received by a non-serving cell signal receiving portion of the communication element or function.

Furthermore, according to an example of an embodiment, there is provided, for example, a method for use in a communication network control element or function configured to control a communication of a communication element or function in a communication network, the method comprising receiving and processing a measurement report from the communication element or function being based on results of measurements of signal quality values signals of signals received by at least two signal receiving portions of the communication element or function, wherein at least one of the at least two signal receiving portions is a serving cell signal receiving portion used for connecting the communication element or function to the communication network via at least one serving cell of the communication network, and at least one other of the at least two signal receiving portions is a non-serving cell signal receiving portion being not used for connecting the communication element or function to the communication network, identifying, from the measurement report, cells whose signals are received by a non-serving cell signal receiving portion of the communication element or function, and preparing a set of selected cells of the communication network for a conditional handover procedure of the communication element or function, wherein the selected cells comprise at least one cell whose signals are received by a non-serving cell signal receiving portion of the communication element or function.

According to further refinements, these examples may include one or more of the following features:

there may be provided to the communication element or function at least one of a dedicated signal receiving portion specific offset value for each of the at least two signal receiving portions of the communication element or function, a first signal receiving portion specific offset value to be used for a non-serving cell signal receiving portion of the communication element or function, and a first signal receiving portion specific offset value to be used for a non-serving cell signal receiving portion of the communication element or function and a second signal receiving portion specific offset value being different to the first signal receiving portion specific offset value and to be used for a serving cell signal receiving portion of the communication element or function;

there may be provided to the communication element or function configuration data allowing the communication element or function to determine at least one of a first signal receiving portion specific offset value to be used for a non-serving cell signal receiving portion of the communication element or function and a second signal receiving portion specific offset value being different to the third signal receiving portion specific offset value and to be used for a serving cell signal receiving portion of the communication element or function the signal receiving portion specific offset value may cause, for a sorting processing for sorting the measurement results and a selecting processing for selecting measurement results to be included in the measurement report, that a parameter used for at least one of the sorting processing and the selecting processing and based on the measurement result of signal quality values received by a non-serving cell signal receiving portion the communication element or function is enhanced compared to a parameter used for at least one of the sorting processing and the selecting processing and based on the measurement result of signal quality values received by a serving cell signal receiving portion the communication element or function;

an indication to which of the at least two signal receiving portions of the communication element or function a measurement result is related may be received in the measurement report and processed, or an indication whether a measurement result is related to a serving cell signal receiving portion of the communication element or function or a non-serving cell signal receiving portion of the communication element or function may be received in the measurement report and processed;

an indication of the signal receiving portion specific offset values used by the communication element or function for deciding on sending the measurement report may be received from the communication element or function and processed.

Furthermore, according to an example of an embodiment, there is provided, for example, an apparatus for use by a communication network control element or function configured to control a communication of a communication element or function in a communication network, the apparatus comprising at least one processing circuitry, and at least one memory for storing instructions to be executed by the processing circuitry, wherein the at least one memory and the instructions are configured to, with the at least one processing circuitry, cause the apparatus at least: to provide to the communication element or function at least one of a dedicated signal receiving portion specific offset value for each of at least two signal receiving portions of the communication element or function, wherein at least one of the at least two signal receiving portions is a serving cell signal receiving portion used for connecting the communication element or function to the communication network via at least one serving cell of the communication network, and at least one other of the at least two signal receiving portions is a non-serving cell signal receiving portion being not used for connecting the communication element or function to the communication network, a first signal receiving portion specific offset value to be used for a non-serving cell signal receiving portion of the communication element or function, a first signal receiving portion specific offset value to be used for a non-serving cell signal receiving portion of the communication element or function and a second signal receiving portion specific offset value being different to the first signal receiving portion specific offset value and to be used for a serving cell signal receiving portion of the communication element or function, and configuration data allowing the communication element or function to determine at least one of a first signal receiving portion specific offset value to be used for a non-serving cell signal receiving portion of the communication element or function and a second signal receiving portion specific offset value being different to the third signal receiving portion specific offset value and to be used for a serving cell signal receiving portion of the communication element or function.

Furthermore, according to an example of an embodiment, there is provided, for example, a method for use in a communication network control element or function configured to control a communication of a communication element or function in a communication network, the method comprising providing to the communication element or function at least one of a dedicated signal receiving portion specific offset value for each of at least two signal receiving portions of the communication element or function, wherein at least one of the at least two signal receiving portions is a serving cell signal receiving portion used for connecting the communication element or function to the communication network via at least one serving cell of the communication network, and at least one other of the at least two signal receiving portions is a non-serving cell signal receiving portion being not used for connecting the communication element or function to the communication network, a first signal receiving portion specific offset value to be used for a non-serving cell signal receiving portion of the communication element or function, a first signal receiving portion specific offset value to be used for a non-serving cell signal receiving portion of the communication element or function and a second signal receiving portion specific offset value being different to the first signal receiving portion specific offset value and to be used for a serving cell signal receiving portion of the communication element or function, and configuration data allowing the communication element or function to determine at least one of a first signal receiving portion specific offset value to be used for a non-serving cell signal receiving portion of the communication element or function and a second signal receiving portion specific offset value being different to the third signal receiving portion specific offset value and to be used for a serving cell signal receiving portion of the communication element or function.

According to further refinements, these examples may include one or more of the following features:

a measurement report may be received from the communication element or function being based on results of measurements of signal quality values signals of signals received by the at least two signal receiving portions of the communication element or function and processed, and a set of selected cells of the communication network for a conditional handover procedure of the communication element or function, may be prepared.

the signal receiving portion specific offset value may cause, for a sorting processing for sorting the measurement results and a selecting processing for selecting measurement results to be included in the measurement report, that a parameter used for at least one of the sorting processing and the selecting processing and based on the measurement result of signal quality values received by a non-serving cell signal receiving portion the communication element or function is enhanced compared to a parameter used for at least one of the sorting processing and the selecting processing and based on the measurement result of signal quality values received by a serving cell signal receiving portion the communication element or function.

In addition, according to embodiments, there is provided, for example, a computer program product for a computer, including software code portions for performing the steps of the above defined methods, when said product is run on the computer. The computer program product may include a computer-readable medium on which said software code portions are stored. Furthermore, the computer program product may be directly loadable into the internal memory of the computer and/or transmittable via a network by means of at least one of upload, download and push procedures.

BRIEF DESCRIPTION OF THE DRAWINGS

Some embodiments of the present disclosure are described below, by way of example only, with reference to the accompanying drawings, in which.

DESCRIPTION OF EMBODIMENTS

Figure 1:
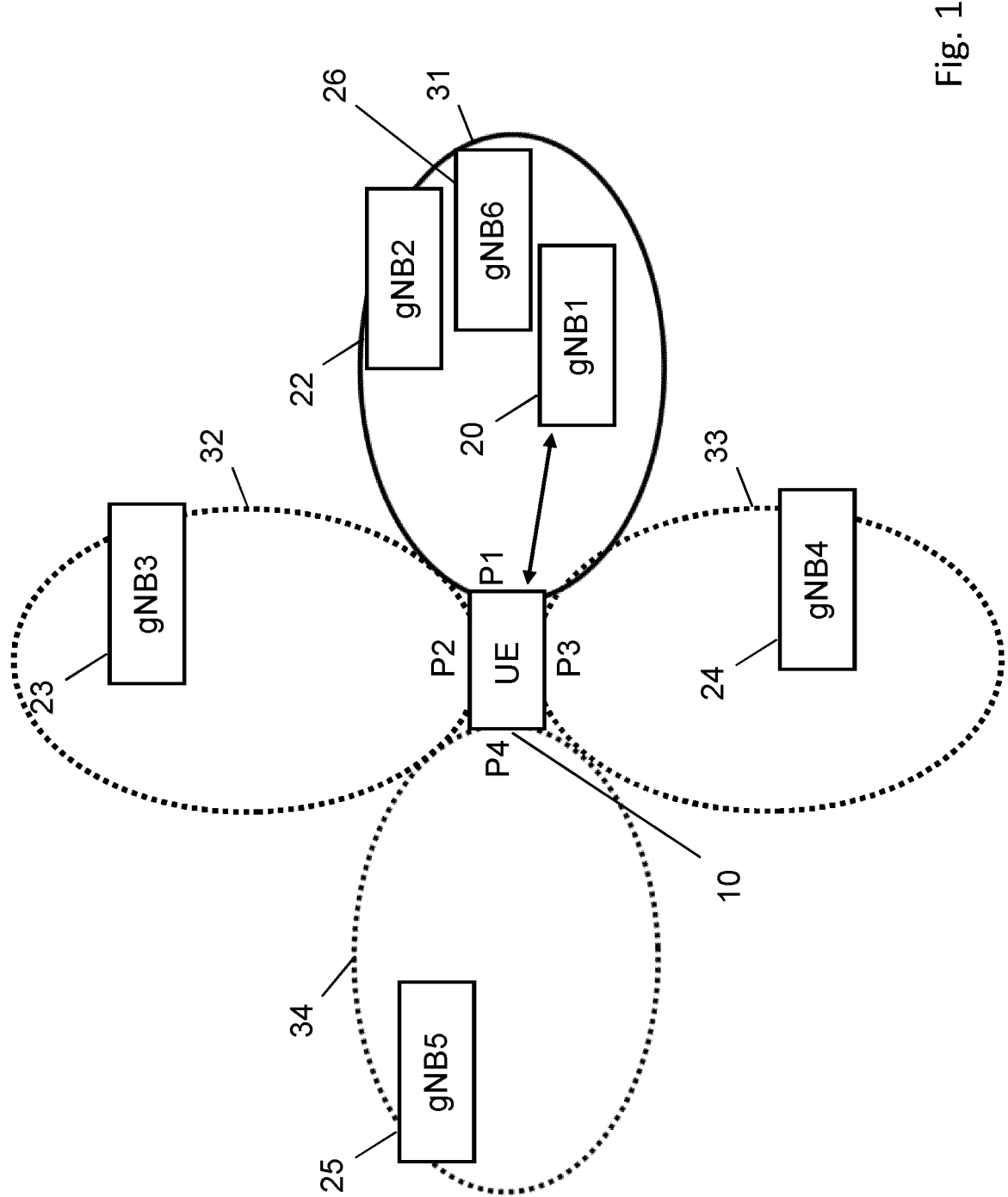
FIG. 1 shows a diagram illustrating an example of a communication network scenario in which a communication control mechanism according to some examples of embodiments is implemented.

In the last years, an increasing extension of communication networks, e.g. of wire based communication networks, such as the Integrated Services Digital Network (ISDN), Digital Subscriber Line (DSL), or wireless communication networks, such as the cdma2000 (code division multiple access) system, cellular $3^{rd}$ generation (3G) like the Universal Mobile Telecommunications System (UMTS), fourth generation (4G) communication networks or enhanced communication networks based e.g. on Long Term Evolution (LTE) or Long Term Evolution-Advanced (LTE-A), fifth generation (5G) communication networks, cellular $2^{nd}$ generation (2G) communication networks like the Global System for Mobile communications (GSM), the General Packet Radio System (GPRS), the Enhanced Data Rates for Global Evolution (EDGE), or other wireless communication system, such as the Wireless Local Area Network (WLAN), Bluetooth or Worldwide Interoperability for Microwave Access (WiMAX), took place all over the world. Various organizations, such as the European Telecommunications Standards Institute (ETSI), the $3^{rd}$ Generation Partnership Project (3GPP), Telecoms & Internet converged Services & Protocols for Advanced Networks (TISPAN), the International Telecommunication Union (ITU), $3^{rd}$ Generation Partnership Project 2 (3GPP2), Internet Engineering Task Force (IETF), the IEEE (Institute of Electrical and Electronics Engineers), the WiMAX Forum and the like are working on standards or specifications for telecommunication network and access environments.

Basically, for properly establishing and handling a communication between two or more end points (e.g. communication stations or elements or functions, such as terminal devices, user equipments (UEs), or other communication network elements, a database, a server, host etc.), one or more network elements or functions (e.g. virtualized network functions), such as communication network control elements or functions, for example access network elements like access points, radio base stations (BS), relay stations, eNBs, gNBs etc., and core network elements or functions, for example control nodes, support nodes, service nodes, gateways, user plane functions, access and mobility functions etc., may be involved, which may belong to one communication network system or different communication network systems.

In new communication systems, such as 5G based systems, beam management represents an important feature, in particular when higher frequency bands are used for communication. Here, radio propagation is more challenging, wherein beamforming is mandatory for the gNB and the UE. While in low carrier areas digital transmission can be used where power amplifiers are present for each antenna element, the situation for higher carriers is different. Here, one power amplifier serves a set of antenna elements, which may be placed on a so-called antenna panel. For the sake of simplicity, in the following, a signal receiving portion comprising one or more antenna elements is also referred to as panel.

UEs can be provided with multiple panels, which allows signal reception also in a challenging environment, where UE movement, rotation or beam blockage would benefit from receive signal diversity.

In the following, different exemplifying embodiments will be described using, as an example of a communication network to which examples of embodiments may be applied, a communication network architecture based on 3GPP standards for a communication network, such as a 5G/NR, without restricting the embodiments to such an architecture, however. It is obvious for a person skilled in the art that the embodiments may also be applied to other kinds of communication networks where mobile communication principles are integrated, e.g. Wi-Fi, worldwide interoperability for microwave access (WiMAX), Bluetooth®, personal communications services (PCS), ZigBee®, wideband code division multiple access (WCDMA), systems using ultra-wideband (UWB) technology, mobile ad-hoc networks (MANETs), wired access, etc.. Furthermore, without loss of generality, the description of some examples of embodiments is related to a mobile communication network, but principles of the disclosure can be extended and applied to any other type of communication network, such as a wired communication network.

The following examples and embodiments are to be understood only as illustrative examples. Although the specification may refer to "an", "one", or "some" example(s) or embodiment(s) in several locations, this does not necessarily mean that each such reference is related to the same example(s) or embodiment(s), or that the feature only applies to a single example or embodiment. Single features of different embodiments may also be combined to provide other embodiments. Furthermore, terms like "comprising"

and "including" should be understood as not limiting the described embodiments to consist of only those features that have been mentioned; such examples and embodiments may also contain features, structures, units, modules etc. that have not been specifically mentioned.

A basic system architecture of a (tele)communication network including a mobile communication system where some examples of embodiments are applicable may include an architecture of one or more communication networks including wireless access network subsystem(s) and core network(s). Such an architecture may include one or more communication network control elements or functions, access network elements, radio access network elements, access service network gateways or base transceiver stations, such as a base station (BS), an access point (AP), a NodeB (NB), an eNB or a gNB, a distributed or a centralized unit, which controls a respective coverage area or cell(s) and with which one or more communication stations such as communication elements or functions, like user devices or terminal devices, like a UE, or another device having a similar function, such as a modem chipset, a chip, a module etc., which can also be part of a station, an element, a function or an application capable of conducting a communication, such as a UE, an element or function usable in a machine-to-machine communication architecture, or attached as a separate element to such an element, function or application capable of conducting a communication, or the like, are capable to communicate via one or more channels via one or more communication beams for transmitting several types of data in a plurality of access domains. Furthermore, core network elements or network functions, such as gateway network elements/functions, mobility management entities, a mobile switching center, servers, databases and the like may be included.

The general functions and interconnections of the described elements and functions, which also depend on the actual network type, are known to those skilled in the art and described in corresponding specifications, so that a detailed description thereof is omitted herein. However, it is to be noted that several additional network elements and signaling links may be employed for a communication to or from an element, function or application, like a communication endpoint, a communication network control element, such as a server, a gateway, a radio network controller, and other elements of the same or other communication networks besides those described in detail herein below.

A communication network architecture as being considered in examples of embodiments may also be able to communicate with other networks, such as a public switched telephone network or the Internet. The communication network may also be able to support the usage of cloud services for virtual network elements or functions thereof, wherein it is to be noted that the virtual network part of the telecommunication network can also be provided by non-cloud resources, e.g. an internal network or the like. It should be appreciated that network elements of an access system, of a core network etc., and/or respective functionalities may be implemented by using any node, host, server, access node or entity etc. being suitable for such a usage. Generally, a network function can be implemented either as a network element on a dedicated hardware, as a software instance running on a dedicated hardware, or as a virtualized function instantiated on an appropriate platform, e.g., a cloud infrastructure.

Furthermore, a network element, such as communication elements, like a UE, a terminal device, control elements or functions, such as access network elements, like a base station (BS), an gNB, a radio network controller, a core network control element or function, such as a gateway element, or other network elements or functions, as described herein, and any other elements, functions or applications may be implemented by software, e.g. by a computer program product for a computer, and/or by hardware.

For executing their respective processing, correspondingly used devices, nodes, functions or network elements may include several means, modules, units, components, etc. (which may not be explained or shown in further detail in the following) which are required for control, processing and/or communication/signaling functionality. Such means, modules, units and components may include, for example, one or more processors or processor units including one or more processing portions for executing instructions and/or programs and/or for processing data, storage or memory units or means for storing instructions, programs and/or data, for serving as a work area of the processor or processing portion and the like (e.g. ROM, RAM, EEPROM, and the like), input or interface means for inputting data and instructions by software (e.g. floppy disc, CD-ROM, EEPROM, and the like), a user interface for providing monitor and manipulation possibilities to a user (e.g. a screen, a keyboard and the like), other interface or means for establishing links and/or connections under the control of the processor unit or portion (e.g. wired and wireless interface means, radio interface means including e.g. an antenna unit or the like, means for forming a radio communication part etc.) and the like, wherein respective means forming an interface, such as a radio communication part, can be also located on a remote site (e.g. a radio head or a radio station etc.). It is to be noted that in the present specification processing portions should not be only considered to represent physical portions of one or more processors, but may also be considered as a logical division of the referred processing tasks performed by one or more processors.

It should be appreciated that according to some examples, a so-called "liquid" or flexible network concept may be employed where the operations and functionalities of a network element, a network function, or of another entity of the network, may be performed in different entities or functions, such as in a node, host or server, in a flexible manner. In other words, a "division of labor" between involved network elements, functions or entities may vary case by case.

Examples of embodiments are related to measurements performed by a communication element or function, such as a UE, which is equipped with a plurality (i.e. at least two) signal receiving portions, such as with multiple panels having high directivity, in particular at higher frequencies. In such UEs, every panel may see (i.e. measure) a different radio environment, i.e. a different set of relevant base stations (also referred to hereinafter as cells).

However, mobile communication at higher frequencies (e.g. around 28 GHz, beyond 53 GHz) suffers higher pathloss. In addition, power amplifiers with decent transmit power are more challenging, and larger bandwidths are used, both of which decrease the power density. These effects influence the link budget (i.e. decreases the cell range/cell size).

It is considered, e.g. in NR, to mitigate this effect by using beamforming at the base station (gNB), but also at the UE side. Antenna arrays are used to create beamforming gain compensating the link budget losses. However, high beamforming gain also implies a high directivity, i.e. the higher the beamforming gain the tighter/narrower are the beams. This directivity is well understood and well specified at the gNB side.

On the other hand, the directivity at the UE side which becomes e.g. more relevant as the frequency is further increased, e.g. beyond 53 GHz, has to be considered separately. A single antenna array or antenna panel can only cover a limited angular area of the whole coverage area (having e.g. a sphere shape). Consequently, UEs may integrate multiple panels to create fully spherical coverage. It is to be noted that the UEs may not have a digital part for every panel, or may not use the digital of non-serving panels in order to avoid unnecessary power consumption.

FIG. 1 shows a diagram illustrating an example of a communication network scenario in which a UE having multiple panels is located in a communication network having a plurality of cells is illustrated. It is to be noted that the scenario shown in FIG. 1 is also usable for explaining a communication control mechanism according to some examples of embodiments.

Specifically, FIG. 1 shows a configuration in which a communication element or function 10, such as a mobile terminal or a UE or another device or entity being connectable to a communication network via a wireless communication connection, is connected and served by a first network area or cell controlled by a corresponding communication network control element or function 20, such as a gNB (gNB1). It is to be noted that the network area in which the UE 10 is located and which serves the UE 10 can be of different types, such as a macro cell, a pico cell or the like.

The UE 10 in FIG. 1 is assumed to use four panels P1, P2, P3, P4 to cover the full azimuth (in FIG. 1, a two-dimensional illustration is shown for simplifying the explanation, but also a 3D application is possible). Each panel points into a different direction. Furthermore, it is assumed that every panel sees/measures a different radio environment.

Reference signs 31, 32, 33 and 33 indicate areas of the radio environment being covered by a respective panel (i.e. signal receiving portion, such as an antenna array or panel having a specified directivity) of the UE 10. In FIG. 1, it is assumed that the panel P1 belonging to area 31 is communicating with gNB1 20. In the following, the panel (here panel P1) via which the communication for connecting UE 10 to the network (i.e. to the serving gNB, here gNB1 20) is conducted, is also referred to as a serving cell panel (or serving cell signal receiving portion).

Additional neighboring network areas controlled by a corresponding communication network control element or function, such as a gNB, are shown in FIG. 1, to which the UE 10 is (currently) not connected but which are in range. Specifically, in the example of FIG. 1, gNB2 22 and gNB6 26 are located such that signaling thereof is received by the serving cell panel P1.

A gNB3 23 is located in an area which is covered by panel P2 belonging to area 32. In the following, a panel via which no communication for connecting UE 10 to the network is conducted is also referred to as a non-serving cell panel (or non-serving cell signal receiving portion). In FIG. 1, such non-serving cell panels are panels P2, P3, and P4. A gNB4 24 is located in an area which is covered by panel P3 belonging to area 33, and gNB5 25 is located in an area which is covered by panel P4 belonging to area 34.

It is to be noted that the communication network control elements or functions 20, 22 to 26 are connected to a core network (CN) not shown in FIG. 1. Furthermore, it is possible that less or more neighboring cells are present.

In the example shown in FIG. 1, it is assumed that gNB1 20 is very close to the UE and has the highest received signal quality. It is to be noted that according to examples of embodiments, signal quality values being considered in measurements related to examples of embodiments may include signal strengths such reference signal received power (RSRP), reference signal received quality (RSRQ), signal-to-interference-and-noise-ratio (SINR), or any other quantity Furthermore, gNB2 22 and gNB6 26 are also assumed to be close to the UE 10 and have a comparatively high received signal quality. These gNBs 20, 22 and 26 are received via panel P1.

On the other hand, gNB3 23, gNB4 24 and gNB5 25 are assumed to have a lower received signal quality at the respective panel P2, P3 and P4, respectively. For example, in the situation of FIG. 1, the following values for signal quality on the panels are assumed:

gNB1: −70 dBm
gNB2: −72 dBm
gNB3: −80 dBm
gNB4: −82 dBm
gNB5: −77 dBm
gNB6: −75 dBm

As indicated above, UE 10 is measures via panel P1 the (very close) cell of gNB1 20 as the strongest cell and uses panel P1 as the serving (or "active") panel. On the other hand, from the non-serving panels, the signal of gNB5 25 is the fourth strongest signal quality; in other words, all cells received via panel P1 are stronger than any other cell.

However, it may happen that an individual panel is blocked by some obstacle, e.g. a user's hand or body, which may occur suddenly. Thus, one or more of the panels may face an obstacle without warning, and a number of strong neighbor cells is inherently blocked.

For example, when assuming that a hand blocks the signal path, an effect on the radiation pattern of e.g. a mmWave patch array can be measured. It is seen that a power drop is induced. When assuming, as an initial situation, a free space which is developed towards a hand closing in on the array panel of interest until fully covering it, for some azimuth angles, the value loss between free space and a e.g. 2.5 cm distance hand is approximately 7 dB. The loss increases, when going to close grip, about 15 dB. This means that within a time period of e.g. 100-200 ms (which is required for the hand to move the last 2.5 cm to close the grip), a gain drop of 15 dB is seen. In summary, a total drop of about 22 dB can be expected, which eliminates the gain achieved by the directivity of the antenna array.

On the other hand, another panel with a different set of neighbors (having previously a lower received signal quality and deemed as being irrelevant for a handover) may become relevant as suddenly. This creates additional challenges to mobility procedures.

Figure 2:
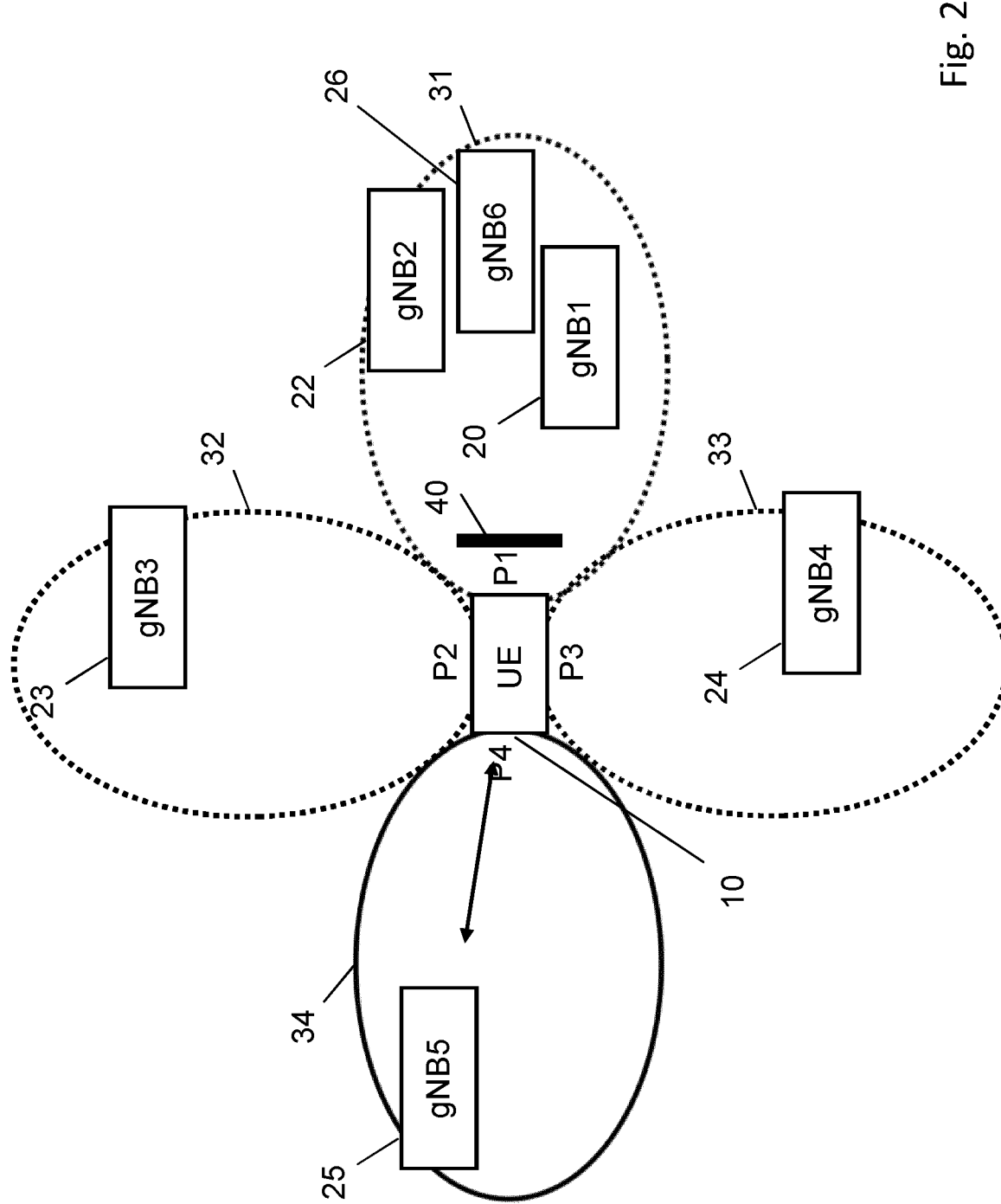
FIG. 2 shows a diagram illustrating the example of a communication network scenario according to FIG. 1 in which an obstacle enter a communication path.

FIG. 2, which is based on FIG. 1, shows a situation when an obstacle 40 (e.g. a user's hand) blocks the signaling path between panel P1 and the cells being received by this panel. In this a situation, the close neighbors gNB1 20, gNB2 22 and gNB6 26 may get completely blocked, i.e. they become irrelevant, while other neighbors (e.g. gNB5 25) become the strongest cell and is thus relevant. It is to be noted that previous measurements have not shown the relevance before the blockage.

For illustration, it is assumed that the obstacle 40 introduces 15 dB additional attenuation. It is to be noted that this value is only for illustrative purposes and may be larger in practice. Thus, in the situation of FIG. 2, the following values for signal quality on the panels are assumed:

gNB1: −85 dBm
gNB2: −87 dBm
gNB3: −80 dBm
gNB4: −82 dBm
gNB5: −77 dBm
gNB6: −90 dBm

Hence, due to the blockage, gNB5 25 received via panel P4 becomes the strongest cell and hence the preferred candidate for a handover.

As indicated above, one problem is that such a blockage can happen very abruptly (even though the UE 10 is not moving at all). In such a case, a handover for the UE 10 from a close cell (e.g. gNB1 20) to a new cell, e.g. gNB5 25, has to be executed in a very short time. This is to be conducted even though previous measurements have shown that other cells (e.g. gNB2 22) are much more relevant than gNB5 25, or have even not shown any relevance of gNB5 25 at all (it was only the $4^{th}$ strongest cell). Since the blockage considers all (previously) relevant cells simultaneously, it is likely that a radio link failure RLF happens ("e.g. too late handover").

It is to be noted, that the same situation occurs when the blockage by the obstacle disappears or when the UE 10 is rotated. In this case, the signal qualities of gNB1 20 and gNB2 22 suddenly become relevant again, although previous measurements have shown their irrelevance due to the blockage (e.g. they are weaker than any other cell).

Furthermore, normal mobility (i.e. a linear movement of the UE 10) has to be considered and supported as well. That is, in case the UE 10 is connected with gNB1 20 as the serving cell, then the most likely (and thereby relevant) neighbour is gNB2 22 and potentially gNB6 26 (without the obstacle appearing).

According to examples of embodiments, the UE 10 does not regularly report all cells in the neighbourhood (in this case the network would have full knowledge); this would be too expensive. Reporting measurement results to the network is typically done based on measurement events as defined e.g. in 3GPP specification TS 38.331. Such events comprise, for example, an Event A1 (Serving becomes better than absolute threshold), Event A2 (Serving becomes worse than absolute threshold), Event A3 (Neighbour becomes amount of offset better than PCell/PSCell), Event A4 (Neighbour becomes better than absolute threshold), Event A5 (PCell/PSCell becomes worse than absolute threshold AND Neighbour/SCell becomes better than another absolute threshold2), Event A6 (Neighbour becomes amount of offset better than Scell). In examples of embodiments, event A3 is assumed to be used.

When an event such as event A3 triggers inside the UE the measurement report to be sent, the UE would send a measurement report with the strongest/relevant cell measurements. Hence, when following this conventional approach, the network may never be aware of a cell on another panel (e.g. of gNB5 25) if it is weaker than neighbors on the serving panel (e.g. gNB2 22 and gNB6 26, as indicated above in connection with FIG. 1).

Typically, the measurements are defined on a per-cell basis, or on a per gNB-beam basis. However, definition on a UE-beam/UE-panel basis would be also useful. It is to be noted that the UE is expected to measure on the strongest panel. To this end, test cases and requirements, e.g. how fast new neighboring cells have to be detected (even if they are on a different panel) are specified.

Consequently, according to examples of embodiments, measures are proposed allowing to distinguish measurements on different panels, and to allow the network to influence how the UE treats measurements on different panels.

For example, when considering the above described example of FIGS. 1 and 2, it may be desirable that the UE considers e.g. gNB5 25 as more relevant compared with gNB6 26 since gNB5 25 is receive by a different panel (panel P4) than the serving cell panel P1 and thus provides more diversity in case the serving panel is blocked.

It is to be noted that one concept to enhance mobility (independent of multiple UE panels) is conditional handover (CHO). CHO is usable to improve handover robustness and avoid failures. The idea is to prepare one or multiple target cells at a very early stage, such that the associated signaling in the serving cell can happen under safe radio conditions. However, in contrast to the legacy handover, the conditional handover is not executed immediately, but only when an execution condition (configured along with the handover itself) triggers to make sure that the access to the target cell happens under safe radio conditions there.

Figure 3:
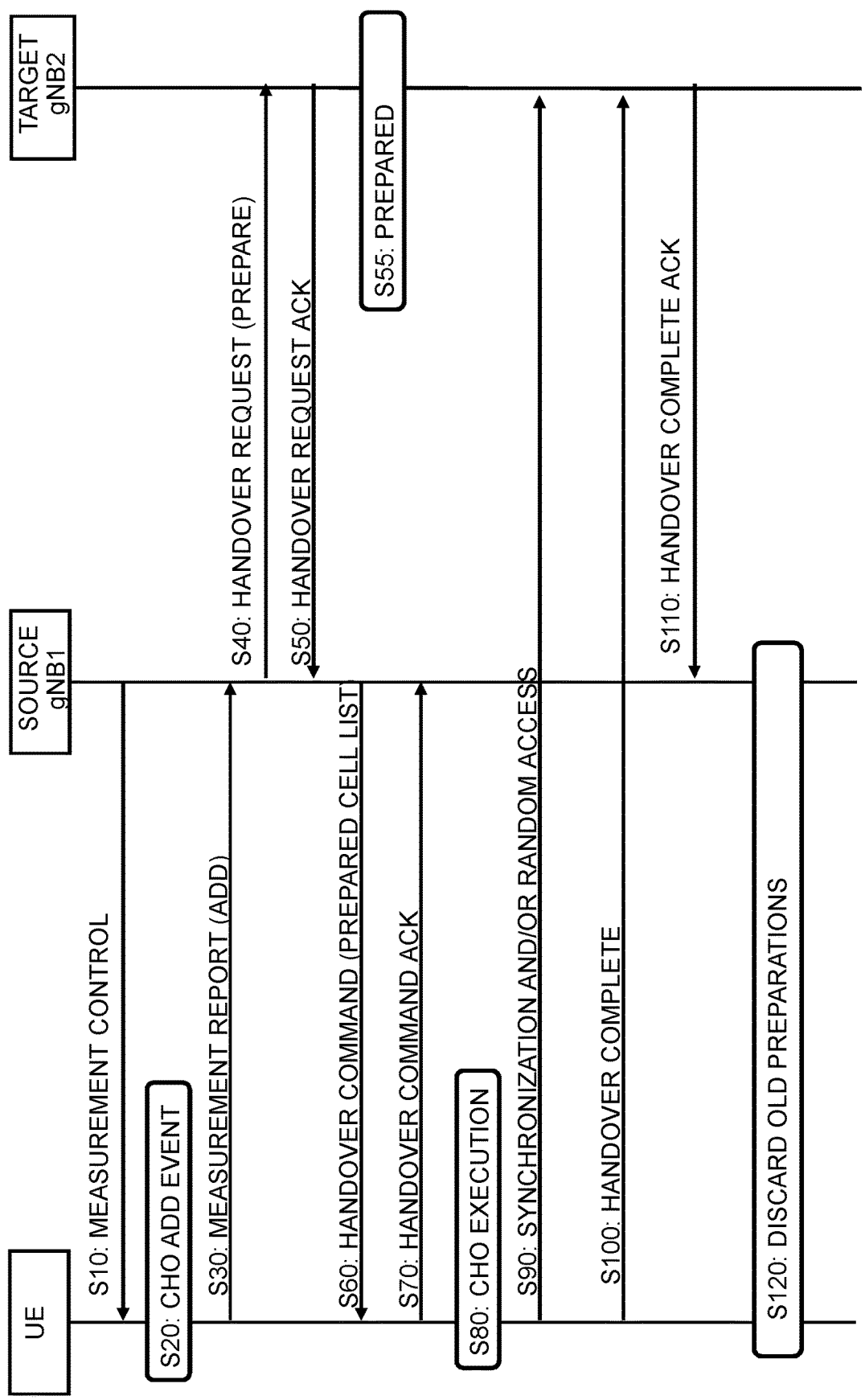
FIG. 3 shows a signaling diagram illustrating a conditional handover procedure.

FIG. 3 shows a signaling diagram illustrating an example of a conditional handover procedure. In FIG. 3, it is assumed that the UE 10 is served by the cell of gNB1 20, which forms the source cell for a handover procedure, and that the cell of gNB2 22 is measured by UE 10 for determining a connection quality thereof and form a potential target cell for a handover. As a matter of course, more than one potential target cell can be determined by the UE 10, e.g. depending on the signal quality (e.g. gNB6, 26). It is to be noted that the processing described in connection with FIG. 3 illustrates only one example for a conditional handover procedure, wherein examples of embodiments are also applicable to other types of conditional handover procedures.

First, in a CHO preparation phase, in which the UE 10 and the target cell are prepared for conducting the conditional handover, in S10, the source cell, i.e. the serving gNB1 20, sends to the UE 10 a measurement control indication in order to instruct the UE 10 to conduct connection quality measurements of neighboring cells for finding candidate handover targets and to report the measurement results to the serving gNB1 20 in case of a measurement event (e.g. event A3).

In response to the instruction in S10, the UE 10 conducts measurements of communication connections qualities of neighboring cells (e.g. cells of the gNBs shown in FIG. 1). In S20, CHO candidate target cell addition event's criteria are met, and UE 10 provides the serving cell gNB1 20 with information on the possible target cell (in FIG. 3, only gNB 22 is shown) by sending a measurement report in S30.

The serving cell gNB1 20 determines the candidate target cell of gNB2 22 and sends a request for HO preparation to the target cell gNB2 22 indicated in measurement report in S40. It is to be noted that the information provided in the measurement report can also result in a cancellation of a cell from a candidate target cell list.

In S50, the target cell sends to the serving cell a response regarding the HO preparation, e.g. in the form of a HO request acknowledgement. Furthermore, the target cell gNB2 22 holds the UE related information for being prepared for a (potential) handover of the UE (S55). According to some examples of embodiments, it is also possible that the target cell gNB2 22 provides also the UE configuration to be used in the target cell in case the HO is executed.

In S60, the serving cell gNB1 20 sends CHO-dedicated event configuration (CHO configuration information) and target cell access information as well as the UE configuration to be used to the UE by means of a handover command for preparing the CHO on the UE side. This is done, for example, by means of an RRC connection reconfiguration message with a CHO configuration. Furthermore, the source cell may add a CHO condition to S60 which will be evaluated by the UE to determine when the CHO is to be executed. In S70, the UE 10 responds to the serving cell gNB1 20 with a handover command acknowledgement.

Now, the CHO preparation phase is completed. That is, the UE 10 still communicates with the serving (source) cell. Then, after some time, a CHO event configured by the CHO condition in S60 is detected by the UE, e.g. a signal level of a neighboring cell configured for CHO becomes offset better than the signal level of the serving cell, which causes the execution of the CHO in S80.

In S90, the UE 10 directly synchronizes to the target cell gNB2 22 (indicated in the prepared cell list received in S60). Furthermore, a random access (RACH) operation is executed; alternatively a RACH-less HO operation is also possible in which case the random access operation is not required. In this situation, no further measurement report is sent to the serving cell.

Then, as soon as the UE 10 obtains access to the target cell gNB2 22, it sends in S100 a HO complete message to the target cell gNB2 22.

The target cell gNB2 22 informs the source cell (i.e. gNB1 20) about handover completion in S110. In S120, the former serving cell gNB1 20 discards all previous preparations for the UE 10. That is, after the successful connection to the target cells, data transmission is resumed between the target cell and UE.

It is to be noted that the CHO configuration information, which define, for example, one or more events causing a CHO, such as a loss of connection quality or the like, can be preset or provided by the network, e.g. from the serving cell gNB1 20. For example, the configuration information is provided in a signaling from the serving cell gNB1 20 in S10 or S60, or in a separate signaling. Alternatively, it is also possible that at least part of the CHO configuration information is provided by a target cell gNB (e.g. gNB2 22), wherein the information is then forwarded via the serving cell gNB1 20, e.g. in connection with S60.

However, when referring again to FIG. 1, when conducting a conventional procedure, it is likely that gNB2 22 and gNB6 26 will be prepared, which is unnecessarily for a situation as shown in FIG. 2, before gNB5 25 would be prepared. It is to be noted that in case the number of target cells is limited to 1 or 2, the blockage shown in FIG. 2 still causes a failure. Only if 3 targets are allowed (which is however costly and thus not preferred), the cell of gNB5 25 would be prepared as well, so that a conditional handover would avoid RLF. The situation may become still more complex when more cells are received on the serving cell panel P1.

Therefore, according to examples of embodiments, it is considered that panel related information are configured, e.g. by the network, wherein the UE applies one or more "panel specific individual offset values", which may sometimes also referred to in the following as "panel specific offset values", "signal receiving portion specific offset values" or "signal receiving portion specific individual offset values" (referred to as "Opn" or "Onsp") which is/are derived from the panel related information. Thus, it is possible that a more suitable measurement reporting of cells is executed which considers the panel(s) where the cells are measured on.

Examples of embodiments, as described below, are applicable in connection with conditional handover (CHO). For example, when a UE is located at a cell edge, the UE may see several cells on the serving panel which are stronger than cells on a non-serving panel. By using CHO, it is possible to prepare multiple targets, wherein one (or more) weaker neighbor cells received on non-serving panels can be prepared in addition (i.e. simultaneously) to the (usually considered) most relevant cell or cells received on the serving panel. However, also applications being different to CHO can be considered, e.g. when a UE is connected to more than one cell in parallel.

According to one example of embodiments, the panel specific individual offset values Opn impact on event conditions considered for the CHO. For example, a panel individual offset is determined and applied in a way similar to other offset values (such as a cell individual offset) used in an event, such as an event A3.

Currently, the event A3 as the cell individual offset, is based on the following relation:

$$Mn + Ofn + Ocn > Mp \quad (1)$$

It is to be noted that formula (1) is simplified and may consider other parameters and offsets, such as a hysteresis factor, which are omitted here for the sake of simplicity.

In formula (1), Mp and Mn are the signal quality measurements of the serving (primary) cell (in case of FIG. 1, gNB1 20) and the neighboring cell(s). Ocn is the cell individual offset, i.e. the measurement Mn of neighbor n can be upgraded (or downgraded) depending on the neighbor n. Ocn can be configured by the network. For instance, a positive offset is configured, when early reporting is desired (e.g. for fast UEs, or in crowded cells for offloading). A negative offset would downgrade the neighbor and postpones reporting. Ofn is a frequency offset depending on the frequency on which neighbor n is measured. The network can assign a positive offset if it wants early reporting of cells on this frequency layer, i.e. if it wants to force handovers to such a cell (e.g. for load balancing, or better velocity support, or any other traffic steering policy).

In a similar way, according to examples of embodiments, the relation shown in formula (1) is extended by an additional offset, i.e. the panel specific individual offset value Opn, as shown in the following formula (2):

$$Mn + Opn + Ofn + Ocn > Mp \quad (2)$$

By means of this extension provided by the panel specific individual offset value Opn, the event condition is changed depending on which panel has received the neighbor n.

For example, it can be considered that, for example, the network (i.e. the serving gNB1 20, for example) configures a separate Opn for each panel P1 to P4. In the example shown in FIG. 1, the network may configure Opn=0 dB for the serving panel P1, and e.g. Opn=+6 dB for the other panels P2, P3 and P4. This would lead to a behavior that cells on other panels would be reported earlier than neighbors on the serving panel.

It is to be noted that according to examples of embodiments, only values for panels are provided where the amount of Opn is different to zero. In other words, when the UE receives dedicated values only for e.g. panels P2 to P4 (which are different to 0 dB) it is deduced that a dedicated value to be set for the panel P1 is set to 0 dB. Alternatively, a value to be used for (any) serving panel is provided by the network as well.

However, for the above described solution, it would be necessary that the network (i.e. gNB1 20) is aware of how many panels the connected UE is using. Furthermore, the network needs to know which one is the serving/active panel, and it has to reconfigure the Opn every time the UE changes the serving panel. This is in particular difficult when the panels are transparent for the network.

Therefore, as a further example of embodiments, Opn values for the individual panels are not directly defined. Instead, the network configures a non-serving panel offset Onsp, e.g. Onsp=6 dB.

That is, in this case, the UE receives only one value for panels which are non-serving panels. A specific value for a serving panel is then not necessary. The UE assigns the received value to the non-serving panels (e.g. P2 to P4). Due to this, the UE can set as the Opn in formula (2) Opn=0 dB if the neighbor n is measured on the same panel as the serving primary cell (i.e. gNB1 20), and Opn=Onsp (i.e. for example 6 dB) if the neighbor n is measured on a different panel than the serving primary cell (i.e. on one of panels P2, P3 and P4).

It is to be noted that in view of the above processing, even though only one parameter (e.g. Onsp) is received by the UE, the UE obtains or assigns (internally) a proper value for the Opn in formula (2) for each panel (i.e. panels P1 to P4 in the illustrated example) wherein for panels where no parameter is defined/received a value of e.g. 0 dB is assumed.

When referring back to the situation explained in connection with FIG. 1, this results in a situation where neighboring cell of gNB5 25 (with −77 dBm) would trigger the UE to send a measurement report including the measurement of gNB5 25 even earlier than neighbor gNB2 22 (with −72 dBm), due to the 6 dB upgrade resulting in a value of −71 dBm for gNB5 25.

According to further examples of embodiments, the panel specific individual offset value Opn is used to impact the ranking of the cells to be reported. Conventionally, the reporting comprises the cell or cells which has/have triggered the report, and/or the X strongest cells (e.g. for periodic reporting). X may be a number being configurable, wherein a possible value of X is e.g. 2 or 3. According to examples of embodiments, instead of reporting the X strongest cells, the UE would report the Y cells with the largest value resulting from Mn+Opn. The value of Y may be the same or different to that of X.

For illustrating the effect of this example of embodiments, reference is made to the situation in FIG. 1.

In the example shown in FIG. 1, it is assumed that the UE 10 measures the following signal quality values: M(gNB1)=−70 dBm, M(gNB2)=−72 dBm, M(gNB6)=−75 dBm, M(gNB5)=−77 dBm gNB1, gNB2 and gNB6 are measured on the serving panel P1, and gNB5 is measured on the non-serving panel P4. When the transmission of the measurement report is triggered in this situation, the reporting of the X strongest cells (X=2, for example) with the conventional setting would lead to a reporting of M(gNB1)=−70 dBm and M(gNB2)=−72 dBm. Now, when implementing the present example of embodiments, assuming e.g. that the value for Opn is set to be 6 dB for non-serving panels (as indicated in the previous example of embodiments), considering Opn for ranking results in an upgrade of M(gNB5) by 6 dB, and hence the UE 10 includes in the report M(gNB1)=−70 dBm and M(gNB5)=−77 dBm.

It is to be noted that the panel specific individual offset value Opn used in the present example is achievable, as described above, either by providing a separate Opn specified for each panel, which is e.g. configured by the network directly, or by using a single parameter for the panel specific individual offset value that is applied to measurements done on non-serving panels, which is also e.g. configured by the network.

Furthermore, according to examples of embodiments, the procedure regarding the ranking described above can be applied with or without the (modified) measurement event conditions as explained above. That is, when executing the procedure without the modified measurement event condition, a trigger for the measurement reporting would not be based on the measurement of the gNB5, i.e. the measurement result of the gNB5 would not trigger the UE 10 to send a measurement report. However, as soon as a measurement report is triggered by measurement result based on another cell, e.g. that of gNB2, the UE includes in the measurement report the result or value of the gNB5 measurement due to its upgraded ranking. In other words, the trigger of the measurement report and the content of the measurement report can be based on different measurement results.

According to a further example of embodiments, when the measurement report is sent after some trigger event occurs, the UE is configured to add into the measurement report signal receiving portion (i.e. panel) related information. That is, the measurement report is extended with panel related information.

For example, in the present example of embodiments, such an extension comprises that, for every reported measurement, an identification of the panel in question is added. This additional identification is e.g. provided in addition to an already existing cell identity, like a PCI. Alternatively, as another example, instead of using a specific identifier, a flag or the like can be used. Such a flag is set to 1 when the measurement was done on a non-serving panel, and set to 0 when the measurement was done on the serving panel, for example.

According to further examples of embodiments, a dynamic and UE autonomous scaling of the value for the panel specific individual offset value Opn is conducted.

For example, the UE is configured to autonomously calculate the panel specific individual offset values Opn. This calculation can be based, for example, on configuration information or rules based on a specification (e.g. a 3GPP specification) or provided by the network. Furthermore, the calculation uses internal information related to communication conditions the UE is facing.

For example, the calculation is based on the number $N_{CHO\_servingPanel}$ of candidate cells for a CHO that have already been configured on the serving cell panel, or on a number $N_{CHO}$ of candidate cells for a CHO that have already been configured on any of the panels (serving cell panel and non-serving cell panel(s)), For illustrating this procedure, the following example can be used. For example, the network configures a parameter, which is e.g. referred to as a slope parameter slope_nsp for non-serving panels. The UE calculates the Opn similar to the example above: Opn=0 dB for the serving panel Opn=slope_nsp * $N_{CHO\_servingPanel}$ Similarly, the UE may be configured by a non-serving panel offset Onsp, and the UE determines the panel specific individual offset values Opn as follows: Opn=0 dB for the serving panel, and Opn=Onsp (Onsp is e.g. 6 dB) on non-serving panels when $N_{CHO\_servingPanel1}$>Nmin, (Nmin representing a threshold being configurable by the UE or the network, wherein a possible value could be e.g. 1), and Opn=0 dB on non-serving panels in case $N_{CHO\_servingPanel}$≤Nmin.

Furthermore, according to some examples of embodiments, as an alternative, the UE chooses the value of Onsp based on Maximum Permissible Exposure (MPE) restrictions.

That is, according to examples of embodiments, the UE can be provided with parameters or the like (like the number of candidate cells $N_{CHO\_servingPanel}$, slope_nsp, and/or any other suitable parameter) and determines which value for Opn is to be set. The actual value for Opn can be also provided by the network (e.g. in a manner as described above) or be preset in the UE. Alternatively, all necessary parameters can be memorized in the UE (e.g. an internal memory) and used for the processing. As a matter of course, it is also possible that the memorized parameters are updated, if necessary, e.g. by the network.

The effect of the above described example of embodiments is illustrated again in connection with the scenario shown in FIG. 1. When assuming that the value for the panel specific offset value Onsp is set to be 6 dB, the more distant cell of gNB5 (with −77 dBm) can be configured as CHO target even before the closer (and more relevant) cell of gNB2 (with −72 dBm). However, this result is possibly not desired, as it would interfere with a handover caused e.g. by a normal movement of the UE where the desired target may be gNB2. On the other hand, the more CHO target the UE has already configured as CHO target on the serving panel (e.g. gNB2), the more relevant it becomes to have a CHO candidate on a different panel (i.e. non-serving panel). That is, when the "normal" handover situation is covered by a sufficient number of CHO candidates, e.g. one, it becomes useful to have a CHO candidate on another panel, for covering also the blockage situation of FIG. 2.

It is to be noted that a similar result is achievable also by reconfiguring the measurement configuration after (or along with) configuring the UE with a CHO target. However, dynamic scaling allows to achieve the desired effect with less effort compared to such a reconfiguration.

According to further examples of embodiments, the UE informs the network (e.g. the serving gNB) about the panel specific individual offset value Opn that it is currently using. In particular, this is useful when the UE autonomously scales the Opn's as described above.

By means of the procedures described in examples of embodiments as indicated above, it is possible that the UE is configured, e.g. by the network, to report neighbors on different panels (i.e. non-serving panel) at an earlier point of time than or at least simultaneously with a neighbor on the same panel (i.e. the serving panel) with similar or even lower signal quality. As a reaction, the network can take appropriate pro-active measures to avoid failures in case of e.g. a sudden blockage of a panel. For example, the network (e.g. the serving gNB) can identify in the measurement report cells being measured on non-serving panels and use them preferably for a legacy handover procedure. The identification is e.g. based on an identification element included in the measurement report. Alternatively, the identification can also consider a relative position of the UE to the serving cell and a cell included in the measurement report; for example when referring to FIG. 1, when the measurement report includes the result related to gNB5, which is on the other side compared to the serving cell in relation to the serving cell, it can be deduced that the gNB5 is measured by a different panel.

Furthermore, as another alternative the serving gNB is configured to prefer or at least consider cells being identified as being received by a non-serving panel as a target cell candidate for a conditional handover (see FIG. 3, where the target gNB would then be gNB5, for example).

Furthermore, according to another example, the serving gNB adds cells identified to be measured on non-serving panels (e.g. gNB5) to a set of serving cells. This is useful, for example, in a dual/multi connectivity scenario, or CoMP. This addition is done, for example, at an earlier point of time than an addition of cells being measured on the serving panel(s). Thus, diversity can be increased.

For illustrating this aspect, reference is made again to FIG. 1. As described above, in such a scenario, the UE 10 is initially served by gNB1 20 via panel P1. When the above described exemplary non-serving panel offset value Onsp=6 dB is used, gNB5 25 on panel P4 would be preferred over C2 and C3 on panel P1. Hence, gNB5 25 represents the first candidate prepared for a conditional handover, or added to a set of serving cells.

For comparison purposes, when using a (more conservative) non-serving panel offset value Onsp=3 dBm, gNB2 22 is the most relevant cell, although it is received by the same panel P1. Hence, gNB2 22 would represent the first candidate prepared for conditional handover, or added to a set of serving cells. However, gNB5 25 would be still preferred against e.g. gNB6 26, to that also in such a scenario the gNB5 25 can be added as second candidate for conditional handover or used for addition to a set of serving cells.

As an example for an implementation of principles of a communication control procedure as described above, e.g. in a standardization of 3GPP related to NR, measures based on the above described examples of embodiments may have effects on the RRC specification 38.331, in particular section 5.5.4 "Measurement report triggering". For example, the network configures the UE with panel related information, while the UE extends the measurement report by panel related information (panel ID or a flag for non-serving panel). The UE behavior is also influenced, e.g. the way how an event condition such as A3 is used.

Figure 4:
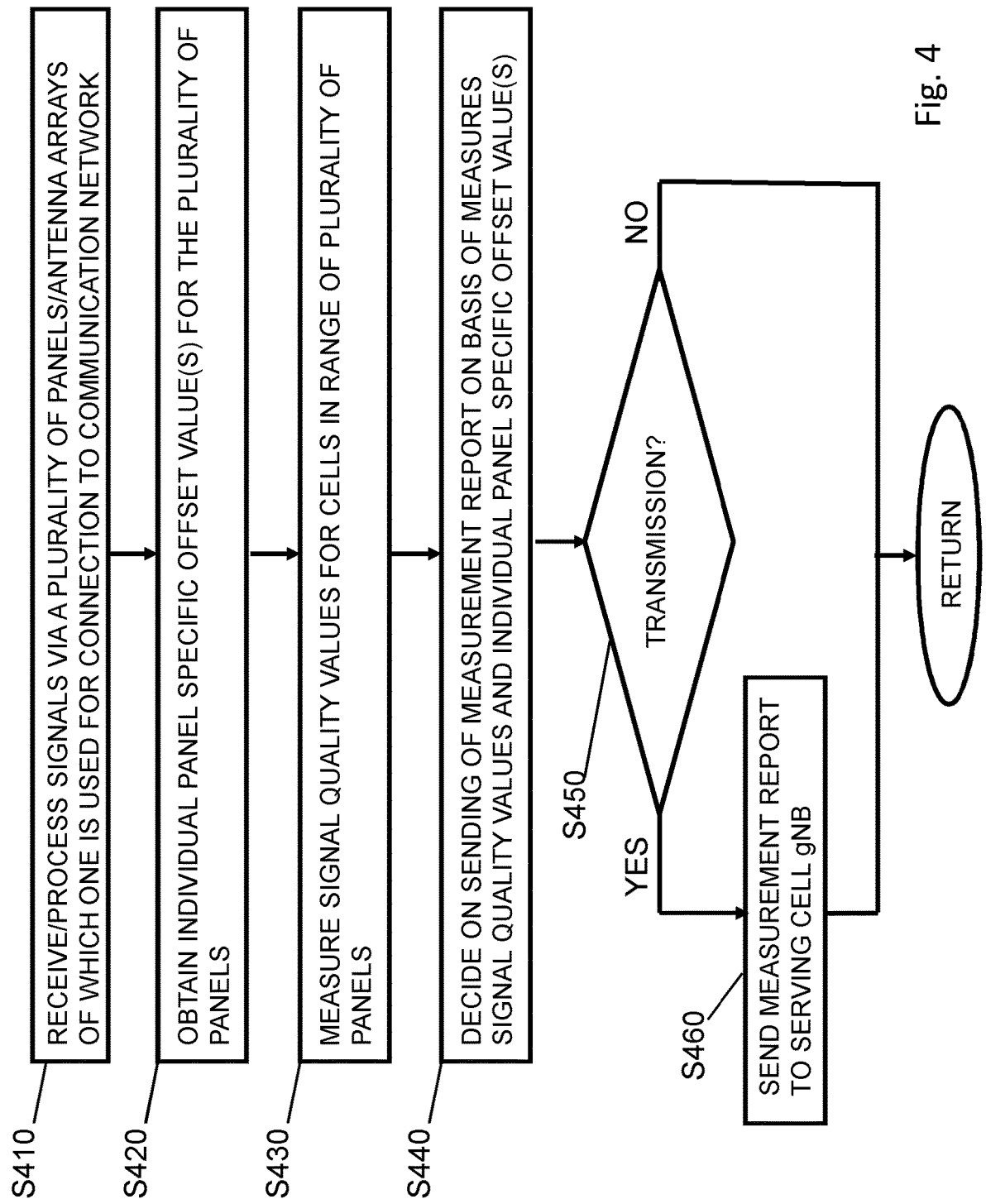
FIG. 4 shows a flow chart illustrating a processing conducted by a communication element or function according to some examples of embodiments.

FIG. 4 shows a flow chart of a processing executed by a communication element or function according to some examples of embodiments, which conducts a communication control procedure according to examples of embodiments of the disclosure. According to some examples of embodiments, the processing shown in FIG. 4 is conducted by a UE having a plurality of signal receiving portions (antenna panels) such as UE 10 shown in FIG. 1, which conducts a communication with a communication network via a serving communication network control element or function, such as gNB1 20 shown in FIG. 1.

In S410, signals from the communication network are received via at least two signal receiving portions (i.e. panels P1 to P4, for example) and processed. At least one of the at least two signal receiving portions is a serving cell signal receiving portion (P1 in the example of FIG. 1) used for connecting to the communication network via at least one serving cell (gNB1 20 in the example of FIG. 1) of the communication network. Others of the at least two signal receiving portions are non-serving cell signal receiving portion (P2 to P4 in the example of FIG. 1) being not used for connecting to the communication network.

For example, the at least two signal receiving portions comprises antenna arrays having receiving properties allowing that signals from the at least one serving cell are received only by a part of the signal receiving portions.

In S420, a signal receiving portion specific offset value (i.e. Opn) for each of the at least two signal receiving portions is obtained.

According to some examples of embodiments, this is achieved by receiving, from the communication network (e.g. the serving gNB) a dedicated signal receiving portion specific offset value for each of the at least two signal receiving portions which is then processed in the UE accordingly (i.e. assigned to the corresponding panel).

Alternatively, a first signal receiving portion specific offset value to be used for a non-serving cell signal receiving portion is received from the communication network and processed.

As a further alternative, a first signal receiving portion specific offset value to be used for a non-serving cell signal receiving portion and a second signal receiving portion specific offset value being different to the first signal receiving portion specific offset value and to be used for a serving cell signal receiving portion are received from the communication network and processed.

That is, according to some examples of embodiments, the UE receives from the network an indication regarding a value to the set for the non-serving cell panel (e.g. 6 dB in the examples described above). Then, for the serving panel, a preset value (e.g. 0 dB) is assumed. Alternatively, both a value for the non-serving panel and a value for the serving panel (which are different to each other) is received from the network Moreover, as another alternative, in a UE autonomous mode, at least a first signal receiving portion specific offset value to be used for a non-serving cell signal receiving portion is determined on the basis of configuration data and current communication conditions. In this case a second signal receiving portion specific offset value to be used for a serving cell signal receiving portion may be set to a preset value, e.g.0 dB. It is to be noted, that also the second signal receiving portion specific offset value to be used for a serving cell signal receiving portion may be determined on the basis of configuration data and current communication conditions.

In this case, the current communication conditions (i.e. internal conditions of the UE) comprise a number of candidates for a conditional handover procedure determined on the basis of signals received by the at least one serving cell signal receiving portion. Alternatively, a maximum permissible exposure restriction for signaling via the at least two signal receiving portions is considered.

According to further examples, the configuration data are data being stored in an internal memory or being received from the communication network. That is, the configuration data can be e.g. specification rules or instructions/data provided by the network. For example, the network provides data or parameters to be used for the determination of the first signal receiving portion specific offset value (and of the second signal receiving portion specific offset value in case it is also to be determined), such as a threshold for a number of candidates for a CHO, or the like.

In S430, signal quality values for signals received by the at least two signal receiving portions from a plurality of cells of the communication network are measured, wherein the plurality of cells include the at least one serving cell.

In S440, it is decided whether a measurement report is sent to the communication network. This decision is based on the results of the measurements of the signal quality values and the signal receiving portion specific offset values for the at least two signal receiving portions.

For example, according to some examples of embodiments, it is decided to send a measurement report to the communication network by using a conditional handover event (e.g. the A3 event as described above) wherein signal quality measurements of the serving cell and at least one non-serving cell are considered.

According to further examples of embodiments, when deciding on sending a measurement report to the communication network, a sorting processing for sorting the measurement results and a selecting processing for selecting measurement results to be included in the measurement report are conducted. In this case, the signal receiving portion specific offset value is used in a calculation process of the sorting process or the selecting process or both. For example, the signal receiving portion specific offset value causes that a parameter of the non-serving panel used for the sorting and/or the selecting processing (which is e.g. based on the signal quality measurement result at a non-serving cell signal receiving portion, such as the measurement result at panel P4 in the above described example) is enhanced compared to a corresponding parameter of a serving panel (which is e.g. based on the signal quality measurement result at the serving cell signal receiving portion, such as panel P1 in the above described example). It is to be noted that the values included in the measurement report are the originally determined signal quality measurement results, for example.

For example, based on the structure as shown in FIG. 1, the UE 10 measures the following values:
gNB1: −80 dBm (at serving panel P1)
gNB2: −82 dBm (also at the serving panel P1)
gNB5: −84 dBm (on non-serving panel P4)

When the UE 10 has to report the two best cells, conventionally, gNB1 with −80 dBm and gNB2 with −82 dBm would be reported. By considering the offset value as described above in the selecting and/or sorting processing for the cells to be reported, when assuming e.g. a non-serving panel offset of 10 dB, the UE reports as the two best cells as gNB5 with −84 dBm and gNB1 with −80 dBm since the calculation would assume for gNB5 a value of −74 dBm (−84 dBm+10 dB=−74 dBm) and consider this −74 dBm for ranking. Hence, gNB5 is seen (internally) as the best cell. In the measurement report, however, the actual measurement which is −84 dBm for gNB5 is indicated.

In S450, in case it is determined that the decision in S440 is affirmative, the process is directed to S460. Here, the sending of a measurement report to the communication network is triggered on the basis of the results of the measurements of the signal quality values or on the basis of a sum of the results of the measurements of the signal quality values and the respective signal receiving portion specific offset value. Then, the process returns.

According to some examples of embodiments, in the measurement report, it is indicated to which of the at least two signal receiving portions a measurement result is related (i.e., for example, which of the panels P1 to P4 as shown in FIG. 1). Alternatively, it is indicated in the measurement whether a measurement result is related to a serving cell signal receiving portion or a non-serving cell signal receiving portion.

Otherwise, if it is determined in S450 that the decision is negative, the processing returns.

According to further examples of embodiments, an indication of the signal receiving portion specific offset values used for deciding on sending the measurement report is also sent to the communication network.

With regard to the processing of a communication network control element or function according to examples of embodiments, such as a serving base station or the like of the UE, like the gNB1 10 in FIG. 1, the following is noted.

According to some examples of embodiments, the presence of any panels at the UE side is transparent to the serving base station. Hence, the serving base station does not require a specific processing with regard to which panel is responsible for which measurement result; rather, the base station automatically prefers cells on non-serving panels if these are upgraded by the panel specific offset.

According to further examples of embodiments, the serving base station identifies cells in the report which are related to non-serving panels of the UE, e.g. by receiving and processing information like a panel ID which may be used for a preferential processing of such cells in a handover preparation.

Furthermore, according to examples of embodiments, the serving base station provides information to the UEs (e.g. dedicated information related to a specific UE, or generally valid information for all UEs connected, irrespective of whether the UE requires the information or not) which supports the communication control procedure as discussed above, i.e. which allows the UE to set a panel specific offset value for the measurement of signal quality received via the respective panels (serving and non-serving).

Figure 5:
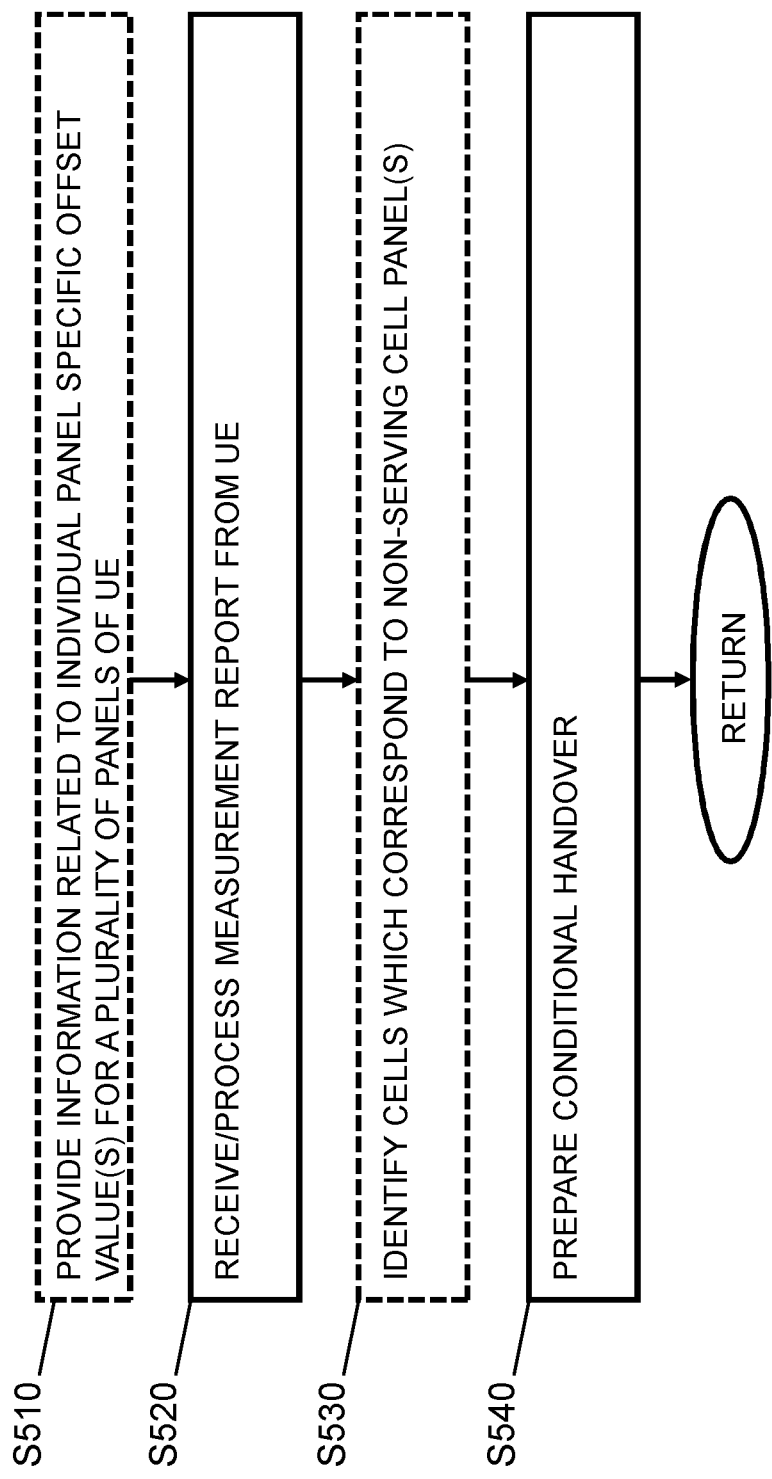
FIG. 5 shows a flow chart illustrating a processing conducted by a communication network control element or function according to some examples of embodiments.

FIG. 5 shows a flow chart of a processing executed by a communication network control element or function according to some examples of embodiments, which conducts a communication control according to examples of embodiments of the disclosure. According to some examples of embodiments, the processing shown in FIG. 5 is conducted by a communication network control element or function like a BS or gNB (e.g. serving gNB like gNB1 20 as shown in FIG. 1) communicating with a UE having a plurality of signal receiving portions (antenna panels) such as UE 10 shown in FIG. 1.

In S510, the communication network control element or function provides a communication element or function (i.e. UE 10, for example) with a dedicated signal receiving portion specific offset value for each of the signal receiving portions of the communication element or function. Alternatively, the communication network control element or function provides the communication element or function (i.e. UE 10, for example) with a first signal receiving portion specific offset value to be used for a non-serving cell signal receiving portion of the communication element or function. Further alternatively, the communication network control element or function provides the communication element or function (i.e. UE 10, for example) with a first signal receiving portion specific offset value to be used for a non-serving cell signal receiving portion of the communication element or function and a second signal receiving portion specific offset value being different to the first signal receiving portion specific offset value and to be used for a serving cell signal receiving portion of the communication element or function.

Still alternatively, in S510, the communication network control element or function provides the communication element or function with configuration data allowing the communication element or function to determine at least a first signal receiving portion specific offset value to be used for a non-serving cell signal receiving portion of the communication element or function. In addition to this, the communication network control element or function provides the communication element or function with configuration data allowing the communication element or function to determine a second signal receiving portion specific offset value being different to the first signal receiving portion specific offset value and to be used for a serving cell signal receiving portion of the communication element or function.

It is to be noted that S510 is optional and can be omitted in case the signal receiving portion specific offset value can be autonomously derived by the UE.

According to examples of embodiments, the signal receiving portion specific offset value (i.e. Opn as described above) causes, for a sorting processing for sorting the measurement results and a selecting processing for selecting measurement results to be included in the measurement report, that a parameter used for at least one of the sorting processing and the selecting processing and based on the measurement result of signal quality values received by a non-serving cell signal receiving portion the communication element or function is enhanced compared to a parameter used for at least one of the sorting processing and the selecting processing and based on the measurement result of signal quality values received by a serving cell signal receiving portion the communication element or function. That is, as described above, the signal receiving portion specific offset value causes that a parameter of the non-serving panel used for the sorting and/or the selecting processing (which is e.g. based on the signal quality measurement result at a non-serving cell signal receiving portion, such as the measurement result at panel P4 in the above described example) is enhanced compared to a corresponding parameter of a serving panel (which is e.g. based on the signal quality measurement result at the serving cell signal receiving portion, such as panel P1 in the above described example).

In S520, a measurement report is received from the communication element or function and processed. The measurement report is based on results of measurements of signal quality values of signals received by at least two signal receiving portions of the communication element or function, wherein at least one of the at least two signal receiving portions is a serving cell signal receiving portion used for connecting the communication element or function to the communication network via at least one serving cell of the communication network, and at least one other of the at least two signal receiving portions is a non-serving cell signal receiving portion being not used for connecting the communication element or function to the communication network, According to examples of embodiments, in the measurement report, an indication is received to which of the at least two signal receiving portions of the communication element or function a measurement result is related, which is then processed. Alternatively, an indication is received in the measurement whether a measurement result is related to a serving cell signal receiving portion of the communication element or function or a non-serving cell signal receiving portion of the communication element or function.

Furthermore, according to some examples of embodiments, in indication is received from the communication element or function regarding the signal receiving portion specific offset values used by the communication element or function for deciding on sending the measurement report, which information is also processed.

In S530, from the measurement report, cells whose signals are received by a non-serving cell signal receiving portion of the communication element or function are identified. It is to be noted that S530 is also an optional processing and can be omitted, e.g. when the panel setting at the UE side is transparent for the base station.

Then, in S540, a set of selected cells of the communication network for a conditional handover procedure of the communication element or function is prepared. In this preparation, the selected cells may comprise at least one cell whose signals are received by a non-serving cell signal receiving portion of the communication element or function. Otherwise, in case the panel specific identification is not present at the base station, the selection is only based on the received measurement results.

Figure 6:
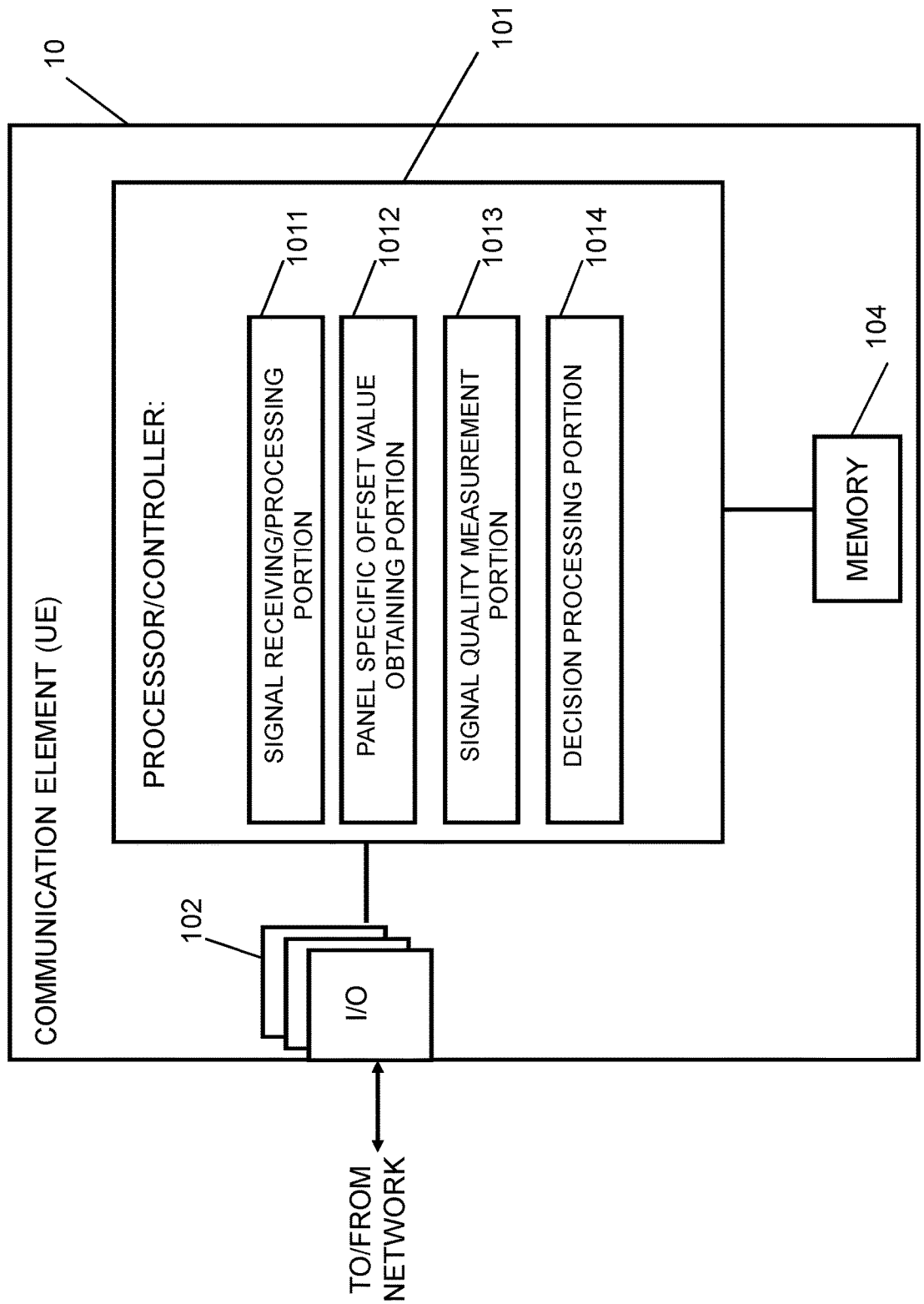
FIG. 6 shows a diagram of a network element or function representing a communication element or function according to some examples of embodiments.

FIG. 6 shows a diagram of a network element or function representing a communication element or function 10 according to some examples of embodiments, e.g. the UE 10 of FIG. 1 or 2, which is configured to communicate under a communication control procedure as described in connection with some of the examples of embodiments. It is to be noted that the communication element or function, like the UE 10 of FIG. 1 or 2, may include further elements or functions besides those described herein below. Furthermore, even though reference is made to a communication element or function, the element or function may be also another device or function having a similar task, such as a chipset, a chip, a module, an application etc., which can also be part of a network element or attached as a separate element to a network element, or the like. It should be understood that each block and any combination thereof may be implemented by various means or their combinations, such as hardware, software, firmware, one or more processors and/or circuitry.

The communication element or function shown in FIG. 6 may include a processing circuitry, a processing function, a control unit or a processor 101, such as a CPU or the like, which is suitable for executing instructions given by programs or the like related to the beam management control procedure. The processor 101 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference sign 102 denotes input/output (I/O) units or functions (interfaces) connected to the processor or processing function 101. The I/O units 102 may be used for communicating with a communication network, such as the gNB 20, as described in connection with FIG. 1 or 2, for example. The I/O units 102 may be a combined unit including communication equipment towards several entities, or may include a distributed structure with a plurality of different interfaces for different entities. Reference sign 104 denotes a memory usable, for example, for storing data and programs to be executed by the processor or processing function 101 and/or as a working storage of the processor or processing function 101. It is to be noted that the memory 104 may be implemented by using one or more memory portions of the same or different type of memory.

The processor or processing function 101 is configured to execute processing related to the above described communication control processing. In particular, the processor or processing circuitry or function 101 includes one or more of the following sub-portions. Sub-portion 1011 is a signal receiving and processing portion which is usable as a portion for receiving and processing a configuration. The portion 1011 may be configured to perform processing according to S410 of FIG. 4. Furthermore, the processor or processing circuitry or function 101 may include a sub-portion 1012 usable as a portion for obtaining panel specific offset values. The portion 1012 may be configured to perform a processing according to S420 of FIG. 4. In addition, the processor or processing circuitry or function 101 may include a sub-portion 1013 usable as a portion for measuring a signal quality. The portion 1013 may be configured to perform a processing according to S430 of FIG. 4. Furthermore, the processor or processing circuitry or function 101 may include a sub-portion 1014 usable as a portion for conducting a decision processing. The portion 1014 may be configured to perform a processing according to S440 of FIG. 4.

Figure 7:
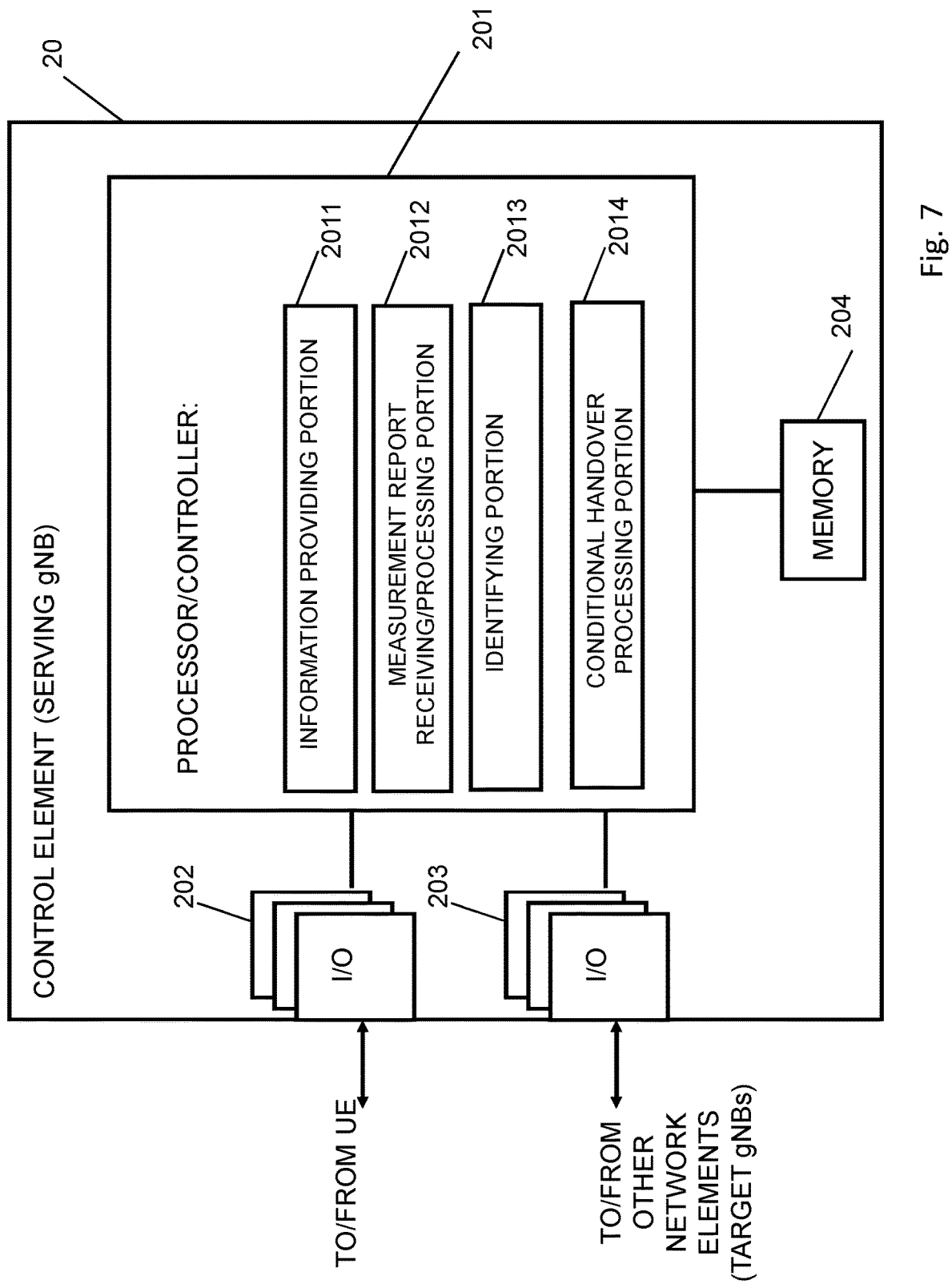
FIG. 7 shows a diagram of a network element or function representing a communication network control element or function according to some examples of embodiments.

FIG. 7 shows a diagram of a network element or function representing a communication network control element or function 20 according to some examples of embodiments, e.g. a gNB like gNB1 20 of FIG. 1 or FIG. 2, of the communication network, or another suitable network element or function of the access network system or core network system of the communication network, which is configured to conduct a control procedure as described in connection with some of the examples of embodiments. It is to be noted that the communication network control element or function 20, like the gNB of FIG. 1 of FIG. 2, may include further elements or functions besides those described herein below. Furthermore, even though reference is made to a communication network control element or function, the element or function may be also another device or function having a similar task, such as a chipset, a chip, a module, an application etc., which can also be part of a network element or attached as a separate element to a network element, or the like. It should be understood that each block and any combination thereof may be implemented by various means or their combinations, such as hardware, software, firmware, one or more processors and/or circuitry.

The communication network control element or function shown in FIG. 7 may include a processing circuitry, a processing function, a control unit or a processor 201, such as a CPU or the like, which is suitable for executing instructions given by programs or the like related to the beam management control procedure. The processor 201 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference sign 202 and 203 denote input/output (I/O) units or functions (interfaces) connected to the processor or processing function 201. The I/O units 202 may be used for communicating with a communication element or function, such as the UE 10, as described in connection with FIGS. 1 and 2, for example. The I/O units 203 may be used for communicating with other network elements, like CN elements. The I/O units 202 and 203 may be a combined unit including communication equipment towards several entities, or may include a distributed structure with a plurality of different interfaces for different entities. Reference sign 204 denotes a memory usable, for example, for storing data and programs to be executed by the processor or processing function 201 and/or as a working storage of the processor or processing function 201. It is to be noted that the memory 204 may be implemented by using one or more memory portions of the same or different type of memory.

The processor or processing function 201 is configured to execute processing related to the above described communication control processing. In particular, the processor or processing circuitry or function 201 includes one or more of the following sub-portions. Sub-portion 2011 is a processing portion which is usable as a portion for providing information related to individual panel specific offset values. The portion 2011 may be configured to perform processing according to S510 of FIG. 5. Furthermore, the processor or processing circuitry or function 201 may include a sub-portion 2012 usable as a portion for receiving and processing measurement reports. The portion 2012 may be configured to perform processing according to S50 of FIG. 5. In addition, the processor or processing circuitry or function 201 may include a sub-portion 2013 usable as a portion for conduction an identification. The portion 2013 may be configured to perform processing according to S530 of FIG. 5. Moreover, the processor or processing circuitry or function 201 may include a sub-portion 2014 usable as a portion for conducting a conditional handover procedure. The portion 2014 may be configured to perform a processing according to S540 of FIG. 5.

It is to be noted that while in examples of embodiments described above a value for a panel specific offset value is described, as one example, to be 6 dB, any other suitable value can be set, which is e.g. situation dependent or network specific. In addition, also a value of 0 dB for serving panel is only an example. According to examples of embodiments, the values can be set depending on current environmental conditions or other conditions, wherein according to some examples of embodiments the value for the non-serving panel is set such that it is enhanced compared to the serving panel. Furthermore, it is to be noted that any other specific number used for a value or threshold or the like is to be understand only as an example usable for illustrative purposes, while it is obvious that other values or numbers can be used when technically meaningful.

By means of examples of embodiments as described above, by means of providing and using panel specific offset values, it is possible to prefer neighbors measured on different panels against neighbors measured on the serving panel. Therefore, macro diversity can be increased, wherein also robustness against failures or poor SI NRs is increased.

Moreover, it is possible to avoid multiple ping-pong between target cells until the right target is picked. Moreover, throughput can be enhanced as a smoother handover process is achievable, while also less interruptions of DL for monitoring on other panels is required.

It is to be noted that examples of embodiments of the disclosure are applicable to various different network configurations. In other words, the examples shown in the above described figures, which are used as a basis for the above discussed examples, are only illustrative and do not limit the present disclosure in any way. That is, additional further existing and proposed new functionalities available in a corresponding operating environment may be used in connection with examples of embodiments of the disclosure based on the principles defined.

According to a further example of embodiments, there is provided, for example, an apparatus for use by a communication element or function configured to conduct a communication in a communication network, the apparatus comprising means configured to receive and process signals from the communication network via at least two signal receiving portions, wherein at least one of the at least two signal receiving portions is a serving cell signal receiving portion used for connecting to the communication network via at least one serving cell of the communication network, and at least one other of the at least two signal receiving portions is a non-serving cell signal receiving portion being not used for connecting to the communication network, means configured to obtain a signal receiving portion specific offset value for each of the at least two signal receiving portions, means configured to measure signal quality values for signals received by the at least two signal receiving portions from a plurality of cells of the communication network, wherein the plurality of cells include the at least one serving cell, and means configured to decide on sending a measurement report to the communication network on the basis of the results of the measurements of the signal quality values and the signal receiving portion specific offset values for the at least two signal receiving portions.

Furthermore, according to some other examples of embodiments, the above defined apparatus may further comprise means for conducting at least one of the processing defined in the above described methods, for example a method according to that described in connection with FIG. 4.

According to a further example of embodiments, there is provided, for example, an apparatus for use by a communication network control element or function configured to control a communication of a communication element or function in a communication network, the apparatus comprising means configured to receive and process a measurement report from the communication element or function being based on results of measurements of signal quality values signals of signals received by at least two signal receiving portions of the communication element or function, wherein at least one of the at least two signal receiving portions is a serving cell signal receiving portion used for connecting the communication element or function to the communication network via at least one serving cell of the communication network, and at least one other of the at least two signal receiving portions is a non-serving cell signal receiving portion being not used for connecting the communication element or function to the communication network, means configured to identify, from the measurement report, cells whose signals are received by a non-serving cell signal receiving portion of the communication element or function, and means configured to prepare a set of selected cells of the communication network for a conditional handover procedure of the communication element or function, wherein the selected cells comprise at least one cell whose signals are received by a non-serving cell signal receiving portion of the communication element or function.

Alternatively, according to a further example of embodiments, there is provided, for example, an apparatus for use by a communication network control element or function configured to control a communication of a communication element or function in a communication network, the apparatus comprising means configured to provide to the communication element or function at least one of a dedicated signal receiving portion specific offset value for each of at least two signal receiving portions of the communication element or function, wherein at least one of the at least two signal receiving portions is a serving cell signal receiving portion used for connecting the communication element or function to the communication network via at least one serving cell of the communication network, and at least one other of the at least two signal receiving portions is a non-serving cell signal receiving portion being not used for connecting the communication element or function to the communication network, a first signal receiving portion specific offset value to be used for a non-serving cell signal receiving portion of the communication element or function, a first signal receiving portion specific offset value to be used for a non-serving cell signal receiving portion of the communication element or function and a second signal receiving portion specific offset value being different to the first signal receiving portion specific offset value and to be used for a serving cell signal receiving portion of the communication element or function, and configuration data allowing the communication element or function to determine at least one of a first signal receiving portion specific offset value to be used for a non-serving cell signal receiving portion of the communication element or function and a second signal receiving portion specific offset value being different to the third signal receiving portion specific offset value and to be used for a serving cell signal receiving portion of the communication element or function.

Furthermore, according to some other examples of embodiments, the above defined alternative apparatuses may further comprise means for conducting at least one of the processing defined in the above described methods, for example a method according to that described in connection with FIG. 5.

According to a further example of embodiments, there is provided, for example, a non-transitory computer readable medium comprising program instructions for causing an apparatus to perform, when conducting a communication control for a communication in a communication network, at least the following: receiving and processing signals from the communication network via at least two signal receiving portions, wherein at least one of the at least two signal receiving portions is a serving cell signal receiving portion used for connecting to the communication network via at least one serving cell of the communication network, and at least one other of the at least two signal receiving portions is a non-serving cell signal receiving portion being not used for connecting to the communication network, obtaining a signal receiving portion specific offset value for each of the at least two signal receiving portions, measuring signal quality values for signals received by the at least two signal receiving portions from a plurality of cells of the communication network, wherein the plurality of cells include the at least one serving cell, and deciding on sending a measurement report to the communication network on the basis of the results of the measurements of the signal quality values and the signal receiving portion specific offset values for the at least two signal receiving portions.

According to a further example of embodiments, there is provided, for example, a non-transitory computer readable medium comprising program instructions for causing an apparatus to perform, when conducting a communication in a communication network, at least the following: receiving and processing a measurement report from the communication element or function being based on results of measurements of signal quality values signals of signals received by at least two signal receiving portions of the communication element or function, wherein at least one of the at least two signal receiving portions is a serving cell signal receiving portion used for connecting the communication element or function to the communication network via at least one serving cell of the communication network, and at least one other of the at least two signal receiving portions is a non-serving cell signal receiving portion being not used for connecting the communication element or function to the communication network, identifying, from the measurement report, cells whose signals are received by a non-serving cell signal receiving portion of the communication element or function, and preparing a set of selected cells of the communication network for a conditional handover procedure of the communication element or function, wherein the selected cells comprise at least one cell whose signals are received by a non-serving cell signal receiving portion of the communication element or function.

According to a further example of embodiments, there is provided, for example, a non-transitory computer readable medium comprising program instructions for causing an apparatus to perform, when conducting a communication in a communication network, at least the following: providing to the communication element or function at least one of a dedicated signal receiving portion specific offset value for each of at least two signal receiving portions of the communication element or function, wherein at least one of the at least two signal receiving portions is a serving cell signal receiving portion used for connecting the communication element or function to the communication network via at least one serving cell of the communication network, and at least one other of the at least two signal receiving portions is a non-serving cell signal receiving portion being not used for connecting the communication element or function to the communication network, a first signal receiving portion specific offset value to be used for a non-serving cell signal receiving portion of the communication element or function, a first signal receiving portion specific offset value to be used for a non-serving cell signal receiving portion of the communication element or function and a second signal receiving portion specific offset value being different to the first signal receiving portion specific offset value and to be used for a serving cell signal receiving portion of the communication element or function, and configuration data allowing the communication element or function to determine at least one of a first signal receiving portion specific offset value to be used for a non-serving cell signal receiving portion of the communication element or function and a second signal receiving portion specific offset value being different to the third signal receiving portion specific offset value and to be used for a serving cell signal receiving portion of the communication element or function.

It should be appreciated that an access technology via which traffic is transferred to and from an entity in the communication network may be any suitable present or future technology, such as WLAN (Wireless Local Access Network), WiMAX (Worldwide Interoperability for Microwave Access), LTE, LTE-A, 5G, Bluetooth, Infrared, and the like may be used; additionally, embodiments may also apply wired technologies, e.g. IP based access technologies like cable networks or fixed lines.

embodiments suitable to be implemented as software code or portions of it and being run using a processor or processing function are software code independent and can be specified using any known or future developed programming language, such as a high-level programming language, such as objective-C, C, C++, C#, Java, Python, Javascript, other scripting languages etc., or a low-level programming language, such as a machine language, or an assembler.

implementation of embodiments is hardware independent and may be implemented using any known or future developed hardware technology or any hybrids of these, such as a microprocessor or CPU (Central Processing Unit), MOS (Metal Oxide Semiconductor), CMOS (Complementary MOS), BiMOS (Bipolar MOS), BiCMOS (Bipolar CMOS), ECL (Emitter Coupled Logic), and/or TTL (Transistor-Transistor Logic).

embodiments may be implemented as individual devices, apparatuses, units, means or functions, or in a distributed fashion, for example, one or more processors or processing functions may be used or shared in the processing, or one or more processing sections or processing portions may be used and shared in the processing, wherein one physical processor or more than one physical processor may be used for implementing one or more processing portions dedicated to specific processing as described, an apparatus may be implemented by a semiconductor chip, a chipset, or a (hardware) module including such chip or chipset;

embodiments may also be implemented as any combination of hardware and software, such as ASIC (Application Specific IC (Integrated Circuit)) components, FPGA (Field-programmable Gate Arrays) or CPLD (Complex Programmable Logic Device) components or DSP (Digital Signal Processor) components.

embodiments may also be implemented as computer program products, including a computer usable medium having a computer readable program code embodied therein, the computer readable program code adapted to execute a process as described in embodiments, wherein the computer usable medium may be a non-transitory medium.

Although the present disclosure has been described herein before with reference to particular embodiments thereof, the present disclosure is not limited thereto and various modifications can be made thereto.

The invention claimed is:

1. An apparatus for use by a communication element or function configured to conduct a communication in a communication network, the apparatus comprising:
at least one processing circuitry, and
at least one memory storing instructions to be executed by the processing circuitry,
wherein the at least one memory and the instructions are configured to, with the at least one processing circuitry, cause the apparatus at least to:
receive and process signals from the communication network via at least two signal receiving portions, wherein at least one of the at least two signal receiving portions is a serving cell signal receiving portion used for connecting to the communication network via at least one serving cell of the communication network, and at least one other of the at least two signal receiving portions is a non-serving cell signal receiving portion being not used for connecting to the communication network,
obtain a signal receiving portion specific offset value for each of the at least two signal receiving portions,
measure signal quality values for signals received by the at least two signal receiving portions from a plurality of cells of the communication network, wherein the plurality of cells include the at least one serving cell, and
decide on sending a measurement report to the communication network on the basis of the results of the measurements of the signal quality values and the signal receiving portion specific offset values for the at least two signal receiving portions.

2. The apparatus according to claim 1, wherein the at least two signal receiving portions comprise antenna arrays having receiving properties allowing that signals from the at least one serving cell are received only by a part of the signal receiving portions.

3. The apparatus according to claim 2, wherein the at least one memory and the instructions are further configured to, with the at least one processing circuitry, cause the apparatus at least to:
obtain the signal receiving portion specific offset value for each of the at least two signal receiving portions by at least one of:
receiving, from the communication network, and processing a dedicated signal receiving portion specific offset value for each of the at least two signal receiving portions,
receiving, from the communication network, and processing a first signal receiving portion specific offset value to be used for a non-serving cell signal receiving portion, and
receiving, from the communication network, and processing a first signal receiving portion specific offset value to be used for a non-serving cell signal receiving portion and a second signal receiving portion specific offset value being different to the first signal receiving portion specific offset value and to be used for a serving cell signal receiving portion.

4. The apparatus according to claim 3, wherein the current communication conditions includes one of
a number of candidates for a conditional handover procedure determined on the basis of signals received by the at least one serving cell signal receiving portion, and
a maximum permissible exposure restriction for signaling via the at least two signal receiving portions.

5. The apparatus according to claim 4, wherein the configuration data comprise data being stored in an internal memory or being received from the communication network.

6. The apparatus according to claim 5, wherein the at least one memory and the instructions are further configured to, with the at least one processing circuitry, cause the apparatus at least to conduct, when deciding on sending a measurement report to the communication network, a sorting processing for sorting the measurement results and a selecting processing for selecting measurement results to be included in the measurement report, wherein the signal receiving portion specific offset value causes that a parameter used for at least one of the sorting processing and the selecting processing and based on the measurement result of signal quality values received by a non-serving cell signal receiving portion is enhanced compared to a parameter used for at least one of the sorting processing and the selecting processing and based on the measurement result of signal quality values received by a serving cell signal receiving portion.

7. The apparatus according to claim 6, wherein the at least one memory and the instructions are further configured to, with the at least one processing circuitry, cause the apparatus at least to decide on sending a measurement report to the communication network by using a conditional handover event considering signal quality measurements of the serving cell and at least one non-serving cell.

8. The apparatus according to claim 7, wherein the at least one memory and the instructions are further configured to, with the at least one processing circuitry, cause the apparatus at least to trigger the sending of a measurement report to the communication network on the basis of the results of the measurements of the signal quality values or on the basis of a sum of the results of the measurements of the signal quality values and the respective signal receiving portion specific offset value.

9. The apparatus according to claim 8, wherein the at least one memory and the instructions are further configured to, with the at least one processing circuitry, cause the apparatus at least to:
indicate in the measurement report to which of the at least two signal receiving portions a measurement result is related, or indicate in the measurement whether a measurement result is related to a serving cell signal receiving portion or a non-serving cell signal receiving portion.

10. The apparatus according to claim 9, wherein the at least one memory and the instructions are further configured to, with the at least one processing circuitry, cause the apparatus at least to send, to the communication network, an indication of the signal receiving portion specific offset values used for deciding on sending the measurement report.

11. The apparatus according to claim 1, wherein the at least one memory and the instructions are further configured to, with the at least one processing circuitry, cause the apparatus at least to:
 obtain the signal receiving portion specific offset value for each of the at least two signal receiving portions by determining at least a first signal receiving portion specific offset value to be used for a non-serving cell signal receiving portion on the basis of configuration data and current communication conditions.

12. An apparatus for use by a communication network control element or function configured to control a communication of a communication element or function in a communication network, the apparatus comprising:
 at least one processing circuitry; and
 at least one memory storing instructions to be executed by the processing circuitry,
 wherein the at least one memory and the instructions are configured to, with the at least one processing circuitry, cause the apparatus at least to:
 receive and process a measurement report from the communication element or function being based on results of measurements of signal quality values signals of signals received by at least two signal receiving portions of the communication element or function, wherein at least one of the at least two signal receiving portions is a serving cell signal receiving portion used for connecting the communication element or function to the communication network via at least one serving cell of the communication network, and at least one other of the at least two signal receiving portions is a non-serving cell signal receiving portion being not used for connecting the communication element or function to the communication network,
 identify, from the measurement report, cells whose signals are received by a non-serving cell signal receiving portion of the communication element or function, and
 prepare a set of selected cells of the communication network for a conditional handover procedure of the communication element or function, wherein the selected cells comprise at least one cell whose signals are received by a non-serving cell signal receiving portion of the communication element or function.

13. The apparatus according to claim 12, wherein the at least one memory and the instructions are further configured to, with the at least one processing circuitry, cause the apparatus at least to:
 provide to the communication element or function at least one of
 a dedicated signal receiving portion specific offset value for each of the at least two signal receiving portions of the communication element or function,
 a first signal receiving portion specific offset value to be used for a non-serving cell signal receiving portion of the communication element or function, and
 a first signal receiving portion specific offset value to be used for a non-serving cell signal receiving portion of the communication element or function and a second signal receiving portion specific offset value being different to the first signal receiving portion specific offset value and to be used for a serving cell signal receiving portion of the communication element or function.

14. The apparatus according to claim 12, wherein the at least one memory and the instructions are further configured to, with the at least one processing circuitry, cause the apparatus at least to provide to the communication element or function configuration data allowing the communication element or function to determine at least one of a first signal receiving portion specific offset value to be used for a non-serving cell signal receiving portion of the communication element or function and a second signal receiving portion specific offset value being different to the third signal receiving portion specific offset value and to be used for a serving cell signal receiving portion of the communication element or function.

15. The apparatus according to claim 12, wherein the signal receiving portion specific offset value causes, for a sorting processing for sorting the measurement results and a selecting processing for selecting measurement results to be included in the measurement report, that a parameter used for at least one of the sorting processing and the selecting processing and based on the measurement result of signal quality values received by a non-serving cell signal receiving portion the communication element or function is enhanced compared to a parameter used for at least one of the sorting processing and the selecting processing and based on the measurement result of signal quality values received by a serving cell signal receiving portion the communication element or function.

16. The apparatus according to claim 15, wherein the at least one memory and the instructions are further configured to, with the at least one processing circuitry, cause the apparatus at least to:
 receive and process an indication in the measurement report to which of the at least two signal receiving portions of the communication element or function a measurement result is related, or
 receive and process an indication in the measurement whether a measurement result is related to a serving cell signal receiving portion of the communication element or function or a non-serving cell signal receiving portion of the communication element or function.

17. The apparatus according to claim 16, wherein the at least one memory and the instructions are further configured to, with the at least one processing circuitry, cause the apparatus at least to receive, from the communication element or function, and process an indication of the signal receiving portion specific offset values used by the communication element or function for deciding on sending the measurement report.

18. An apparatus for use by a communication network control element or function configured to control a communication of a communication element or function in a communication network, the apparatus comprising:
 at least one processing circuitry; and
 at least one memory storing instructions to be executed by the processing circuitry,
 wherein the at least one memory and the instructions are configured to, with the at least one processing circuitry, cause the apparatus at least to:
 provide to the communication element or function at least one of
 a dedicated signal receiving portion specific offset value for each of at least two signal receiving portions of the communication element or function, wherein at least one of the at least two signal receiving portions is a serving cell signal receiving portion used for connecting the communication element or function to the communication network via at least one serving cell of the communication network, and at least one other of the at least two signal receiving portions is a non-serving cell signal receiving portion being not used for connecting the communication element or function to the communication network, a first signal receiving portion specific offset value to be used for a non-serving cell signal receiving portion of the communication element or function, a first signal receiving portion specific offset value to be used for a non-serving cell signal receiving portion of the communication element or function and a second signal receiving portion specific offset value being different to the first signal receiving portion specific offset value and to be used for a serving cell signal receiving portion of the communication element or function, and configuration data allowing the communication element or function to determine at least one of a first signal receiving portion specific offset value to be used for a non-serving cell signal receiving portion of the communication element or function and a second signal receiving portion specific offset value being different to the third signal receiving portion specific offset value and to be used for a serving cell signal receiving portion of the communication element or function.

19. The apparatus according to claim 18, wherein the at least one memory and the instructions are further configured to, with the at least one processing circuitry, cause the apparatus at least to:

receive and process a measurement report from the communication element or function being based on results of measurements of signal quality values signals of signals received by the at least two signal receiving portions of the communication element or function, and prepare a set of selected cells of the communication network for a conditional handover procedure of the communication element or function.

20. The apparatus according to claim 18, wherein the signal receiving portion specific offset value causes, for a sorting processing for sorting the measurement results and a selecting processing for selecting measurement results to be included in the measurement report, that a parameter used for at least one of the sorting processing and the selecting processing and based on the measurement result of signal quality values received by a non-serving cell signal receiving portion the communication element or function is enhanced compared to a parameter used for at least one of the sorting processing and the selecting processing and based on the measurement result of signal quality values received by a serving cell signal receiving portion the communication element or function.

* * * * *